Figure 10:

(No Model.) 23 Sheets—Sheet 1.
R. C. MANVILLE.
METHOD OF AND MACHINE FOR MAKING GARMENT HOOKS.
No. 491,289. Patented Feb. 7, 1893.
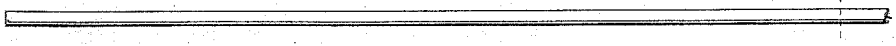
FIG. 1.
FIG. 2.
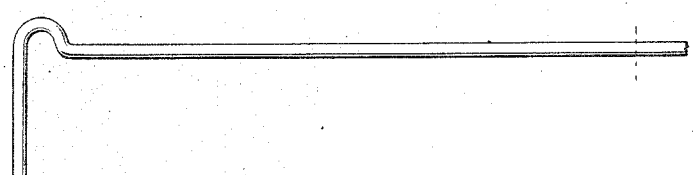
FIG. 3.
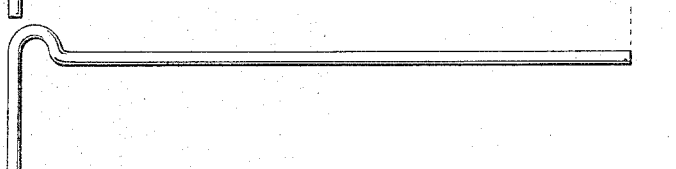
FIG. 4.
FIG. 5ª 
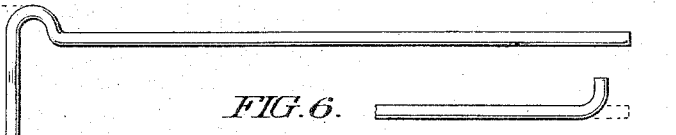
FIG. 5.
FIG. 6.
FIG. 7.
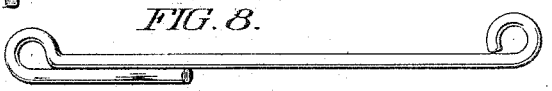
FIG. 8.

FIG. 11.

WITNESSES:
N. E. Paige
F. Norman Dixon
INVENTOR:
R. C. Manville
Wm C Strawbridge
By his Attorneys
Bonsall Taylor (No Model.) 23 Sheets—Sheet 2.

R. C. MANVILLE.
METHOD OF AND MACHINE FOR MAKING GARMENT HOOKS.

No. 491,289. Patented Feb. 7, 1893.

WITNESSES:
N. E. Paige
J. Norman Dixon

INVENTOR:
R. C. Manville,
By his Attorneys,
Wm. C. Strawbridge
J. Bonsall Taylor (No Model.) 23 Sheets—Sheet 3.
R. C. MANVILLE.
METHOD OF AND MACHINE FOR MAKING GARMENT HOOKS.

No. 491,289. Patented Feb. 7, 1893.

WITNESSES:
N. E. Paige
F. Norman Dixon.

R. C. Manville,
INVENTOR:
By his Attorneys
Wm. C. Strawbridge
J. Bonsall Taylor (No Model.)   R. C. MANVILLE.   23 Sheets—Sheet 4.
METHOD OF AND MACHINE FOR MAKING GARMENT HOOKS.
No. 491,289.   Patented Feb. 7, 1893.

WITNESSES:
N. E. Paige
F. Norman Dixon.

R. C. Manville,
INVENTOR:
By his Attorneys
Wm. C. Strawbridge
J. Bonsall Taylor (No Model.) 23 Sheets—Sheet 6.
R. C. MANVILLE.
METHOD OF AND MACHINE FOR MAKING GARMENT HOOKS.
No. 491,289. Patented Feb. 7, 1893.
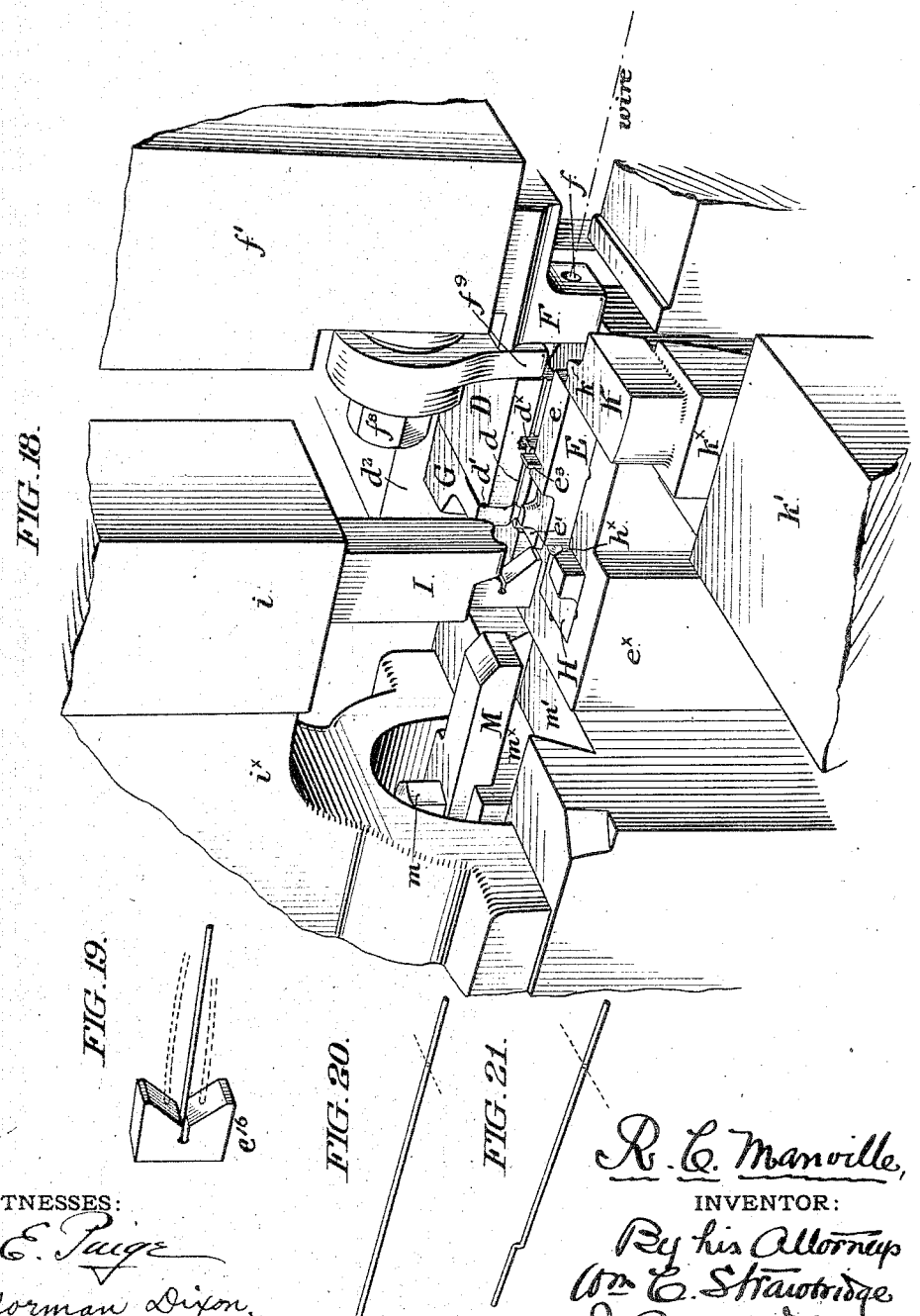
WITNESSES:
N. E. Paige
F. Norman Dixon.
R. C. Manville,
INVENTOR:
By his Attorneys
Wm. C. Strawbridge
J. Bonsall Taylor (No Model.)  
23 Sheets—Sheet 7.
R. C. MANVILLE.
METHOD OF AND MACHINE FOR MAKING GARMENT HOOKS.
No. 491,289.  
Patented Feb. 7, 1893.
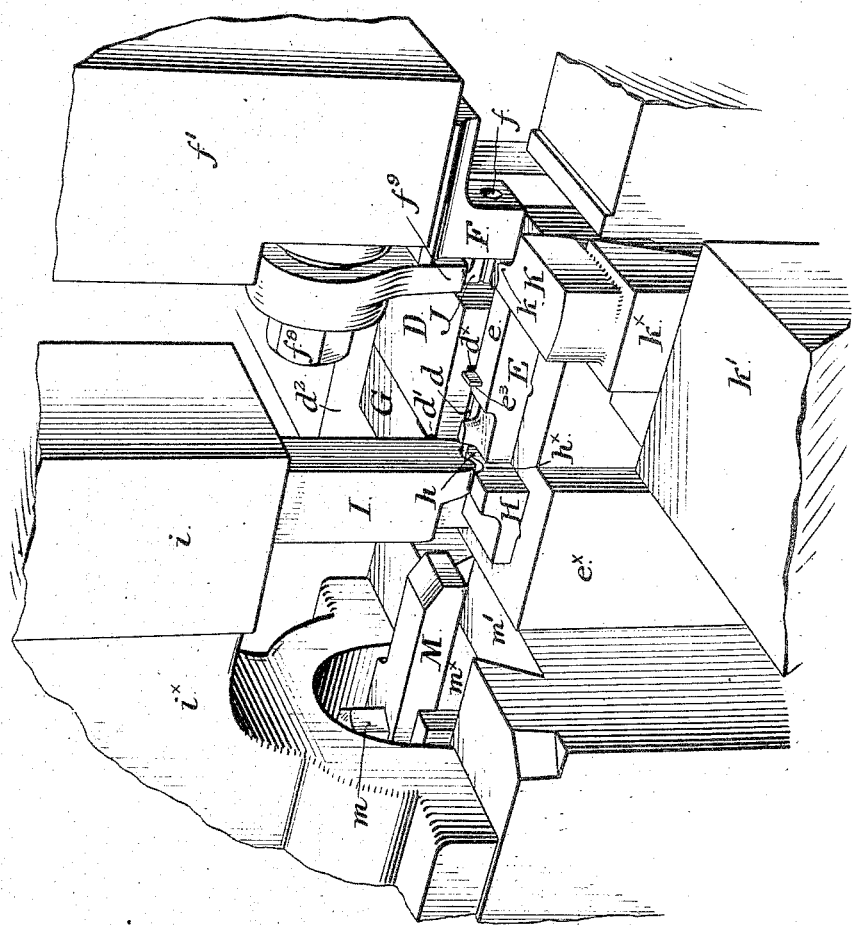
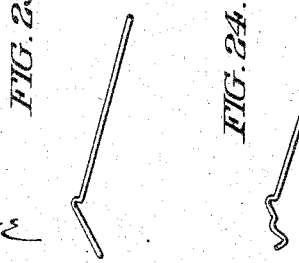
WITNESSES:  
N. E. Paige  
F. Norman Dixon.
INVENTOR:  
R. C. Manville,  
By his Attorneys  
Wm. C. Strawbridge  
J. Bonsall Taylor (No Model.)  23 Sheets—Sheet 8.
R. C. MANVILLE.
METHOD OF AND MACHINE FOR MAKING GARMENT HOOKS.
No. 491,289. Patented Feb. 7, 1893.
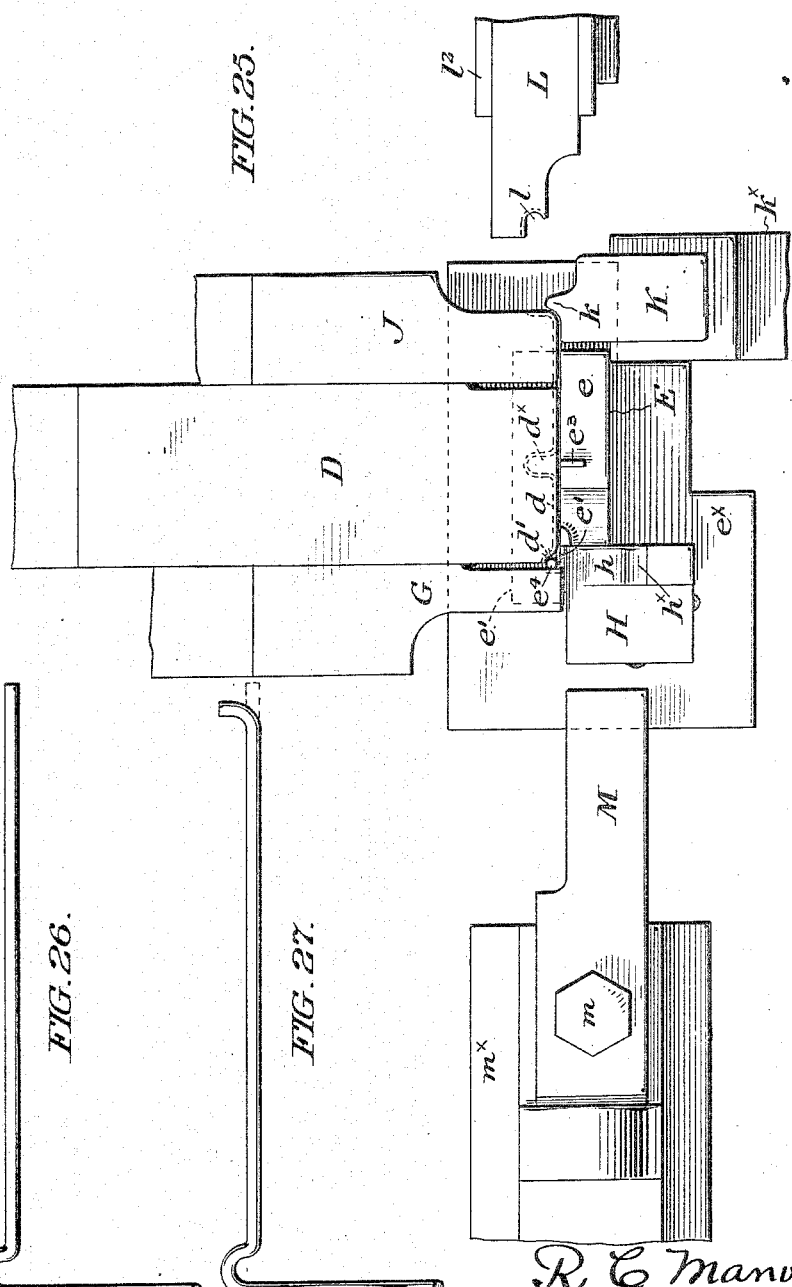
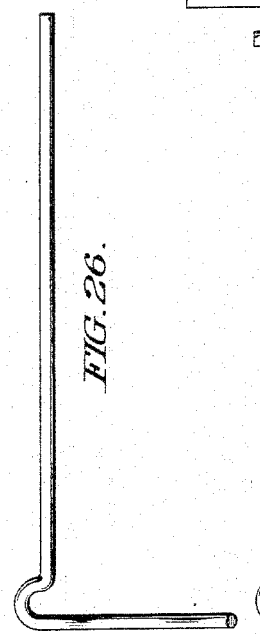
WITNESSES:
J. E. Paige
F. Norman Dixon
R. C. Manville,
INVENTOR:
By his Attorneys
Wm. C. Strawbridge
Bonsall Taylor

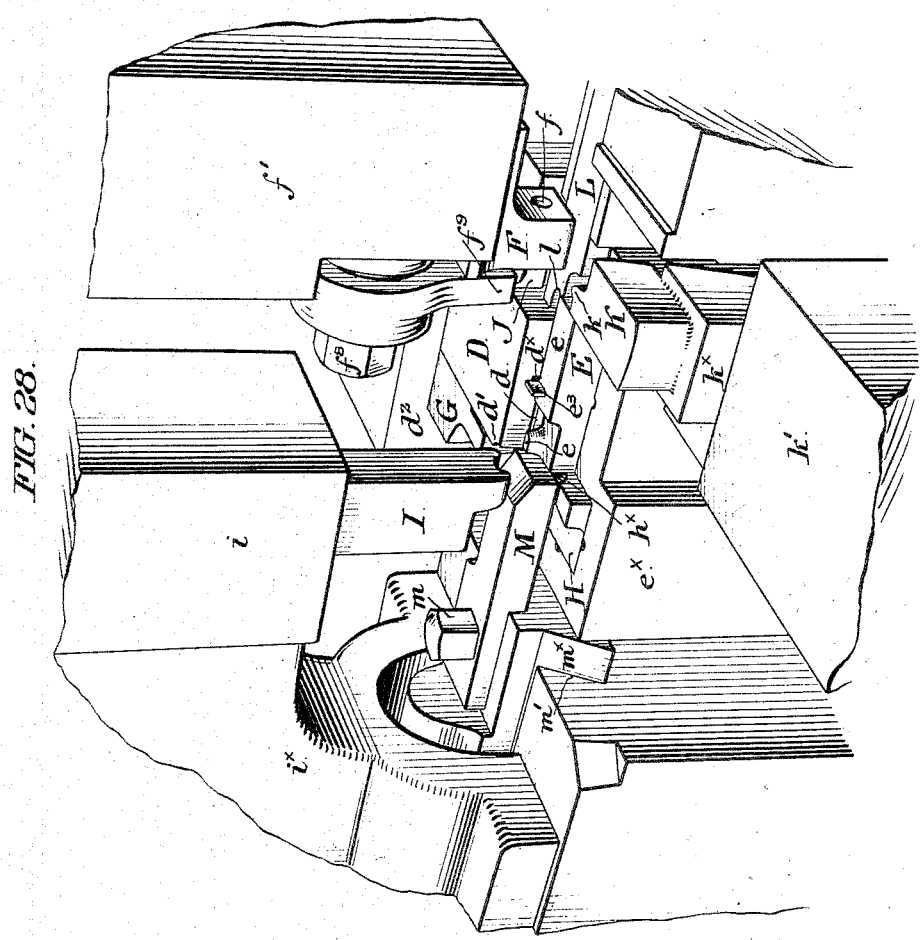

(No Model.)  
23 Sheets—Sheet 10.
R. C. MANVILLE.  
METHOD OF AND MACHINE FOR MAKING GARMENT HOOKS.
No. 491,289.  
Patented Feb. 7, 1893.
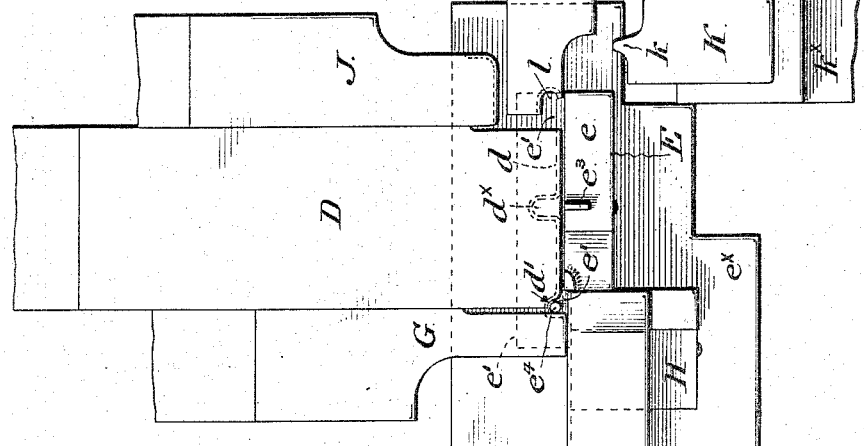
FIG. 31.
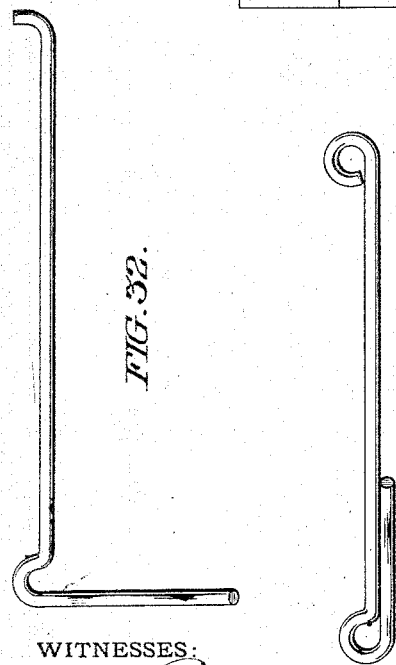
FIG. 32.  
FIG. 33.
WITNESSES:  
N. E. Paige  
J. Norman Dixon
R. C. Manville,  
INVENTOR:  
By his Attorneys  
Wm. C. Strawbridge  
J. Bonsall Taylor (No Model.) 23 Sheets—Sheet 11.
R. C. MANVILLE.
METHOD OF AND MACHINE FOR MAKING GARMENT HOOKS.
No. 491,289. Patented Feb. 7, 1893.
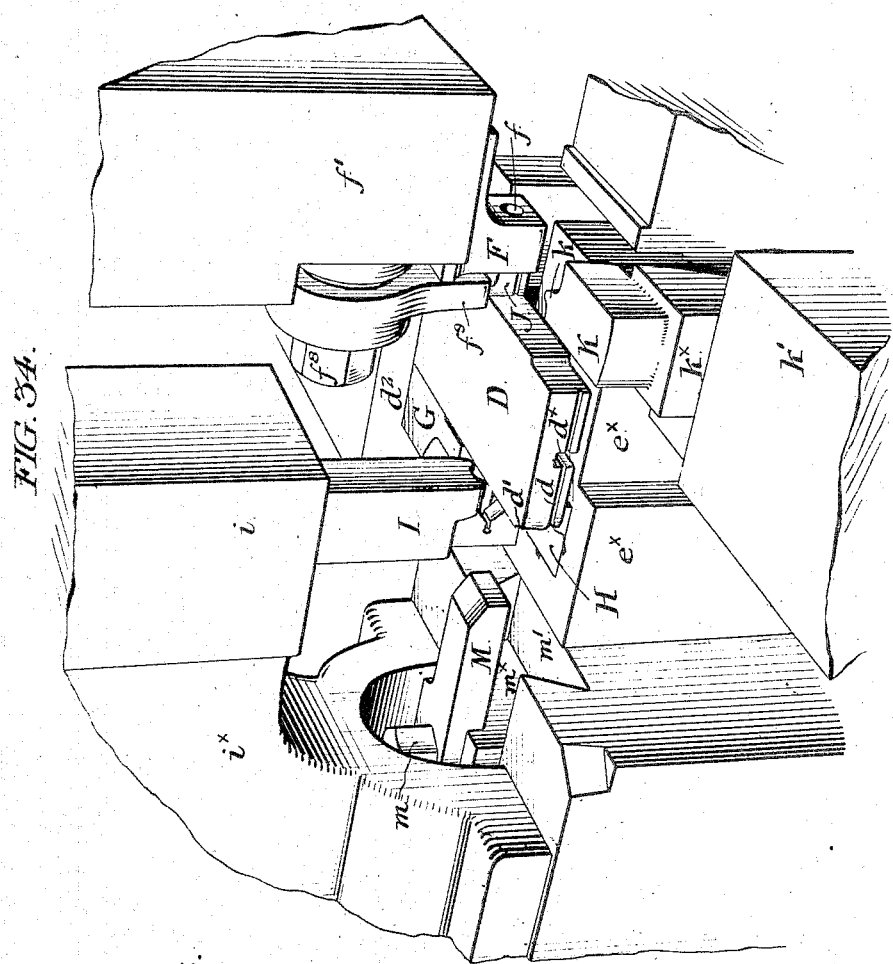
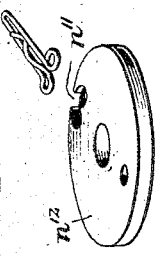

(No Model.)  23 Sheets—Sheet 12.

R. C. MANVILLE.
METHOD OF AND MACHINE FOR MAKING GARMENT HOOKS.

No. 491,289. Patented Feb. 7, 1893.

WITNESSES:
N. E. Paige
F. Norman Dixon

R. C. Manville INVENTOR:
By his Attorneys,
Wm. C. Strawbridge
Bonsall Taylor (No Model.)

R. C. MANVILLE.

METHOD OF AND MACHINE FOR MAKING GARMENT HOOKS.

No. 491,289. Patented Feb. 7, 1893.

WITNESSES:
N. E. Paige
F. Norman Dixon

R. C. Manville INVENTOR:
By his Attorneys
Wm C. Strawbridge
Bonsall Taylor (No Model.) 23 Sheets—Sheet 14.
R. C. MANVILLE.
METHOD OF AND MACHINE FOR MAKING GARMENT HOOKS.
No. 491,289. Patented Feb. 7, 1893.
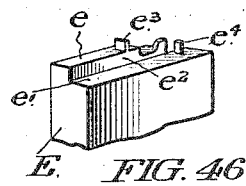
FIG. 46.
FIG. 45.
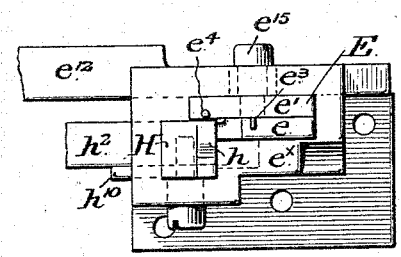
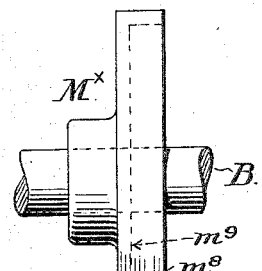
FIG. 44.
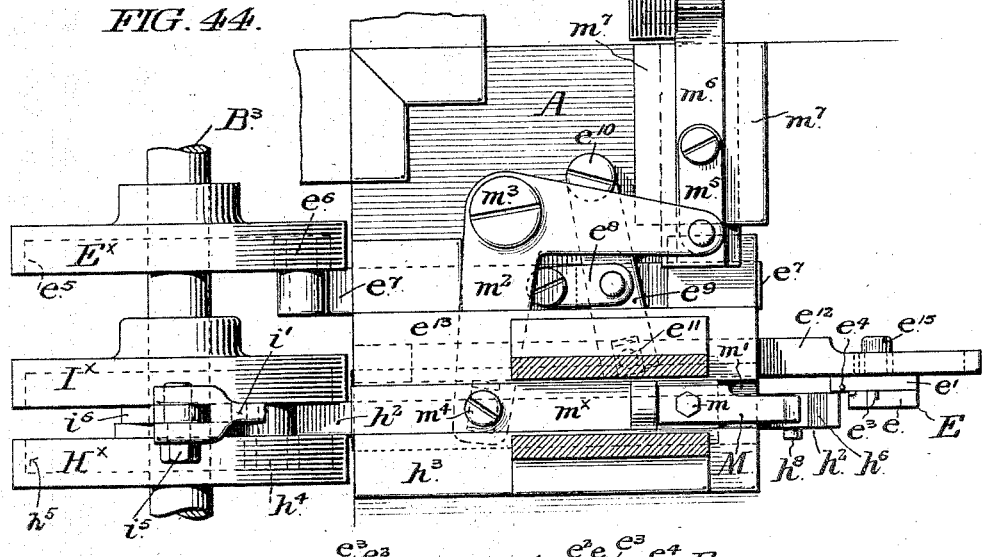
FIG. 47.
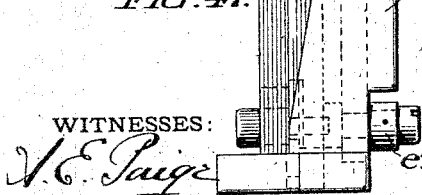
FIG. 48.
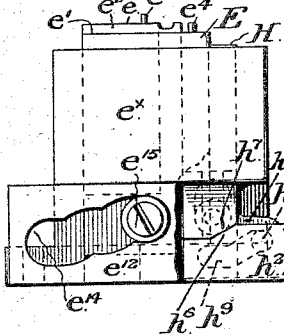
WITNESSES:
INVENTOR:
R. C. Manville
By his Attorney
Wm. C. Strawbridge
J. Bonsall Taylor (No Model.)  23 Sheets—Sheet 15.
R. C. MANVILLE.
METHOD OF AND MACHINE FOR MAKING GARMENT HOOKS.
No. 491,289.  Patented Feb. 7, 1893.
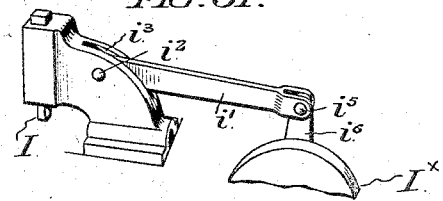
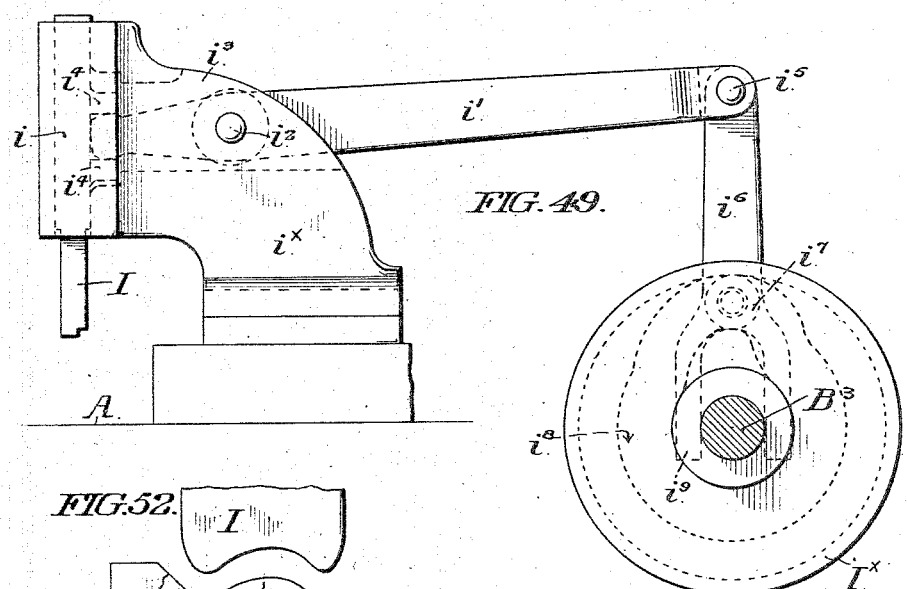
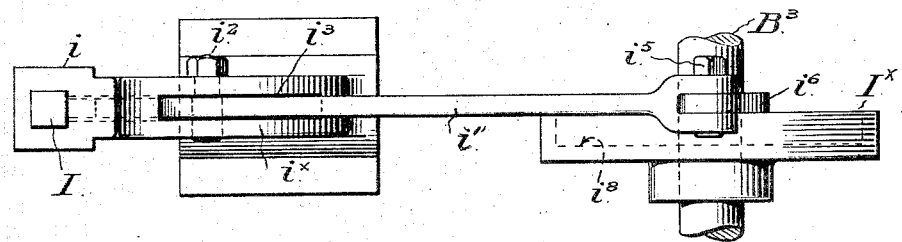
WITNESSES:
N. E. Paige
F. Norman Dixon
R. C. Manville
INVENTOR:
By his Attorneys,
Wm. E. Strawbridge
D. Bonsall Taylor (No Model.)  23 Sheets—Sheet 16.

R. C. MANVILLE.
METHOD OF AND MACHINE FOR MAKING GARMENT HOOKS.

No. 491,289. Patented Feb. 7, 1893.

(No Model.) 23 Sheets—Sheet 17.
R. C. MANVILLE.
METHOD OF AND MACHINE FOR MAKING GARMENT HOOKS.
No. 491,289. Patented Feb. 7, 1893.
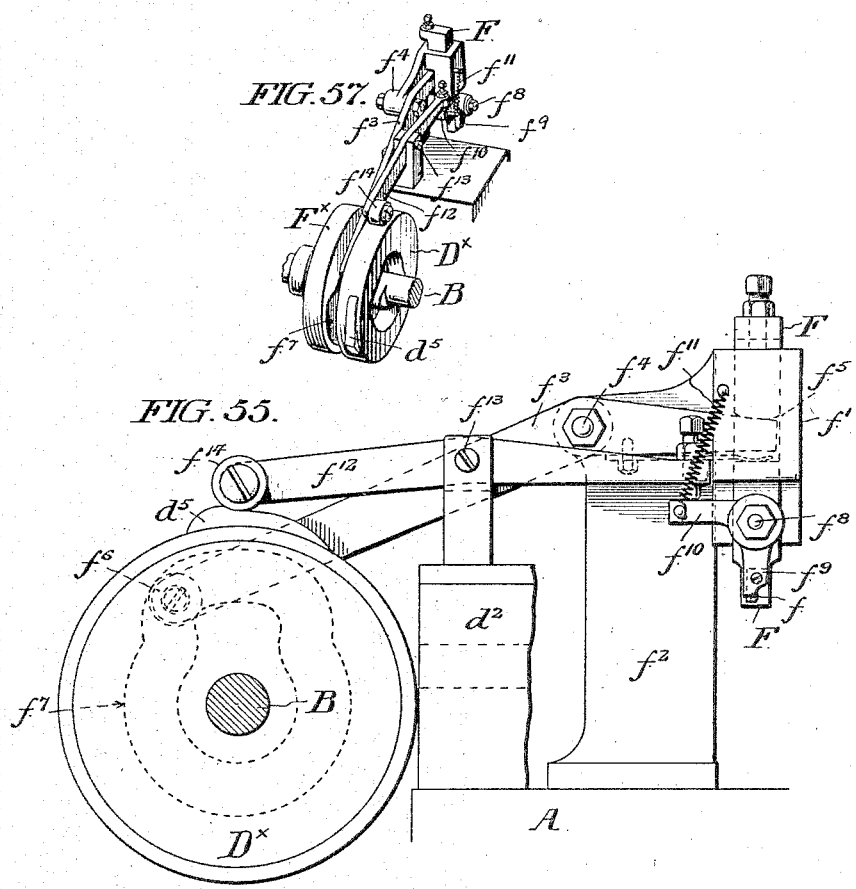
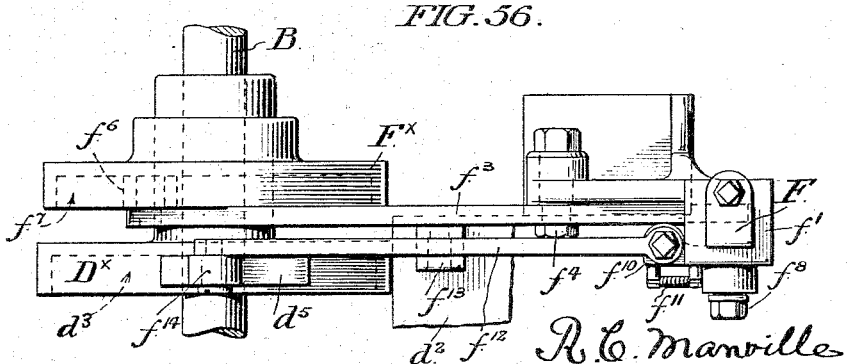
WITNESSES:
J. E. Paige
F. Norman Dixon
R. C. Manville,
INVENTOR:
By his Attorneys
Wm. C. Strawbridge
Bonsall Taylor (No Model.) 23 Sheets—Sheet 18.
R. C. MANVILLE.
METHOD OF AND MACHINE FOR MAKING GARMENT HOOKS.
No. 491,289. Patented Feb. 7, 1893.
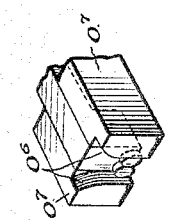
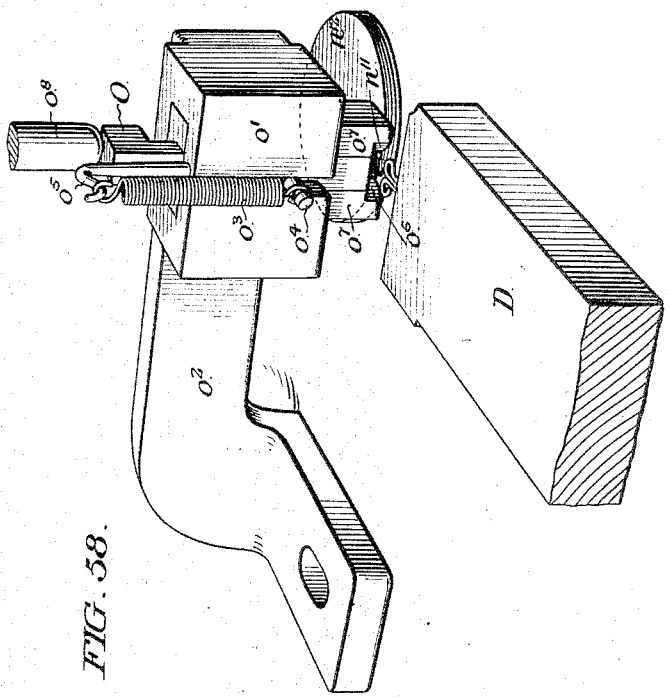
WITNESSES:
INVENTOR:

(No Model.) 23 Sheets—Sheet 19.
R. C. MANVILLE.
METHOD OF AND MACHINE FOR MAKING GARMENT HOOKS.
No. 491,289. Patented Feb. 7, 1893.
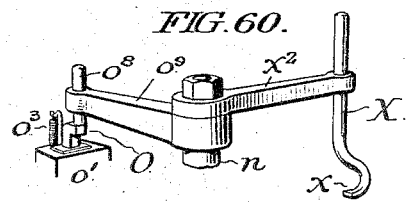
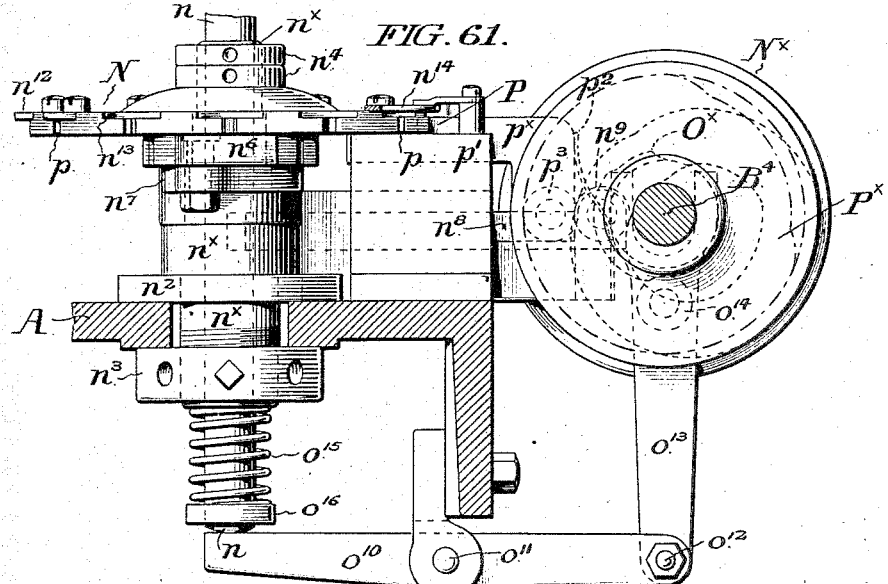
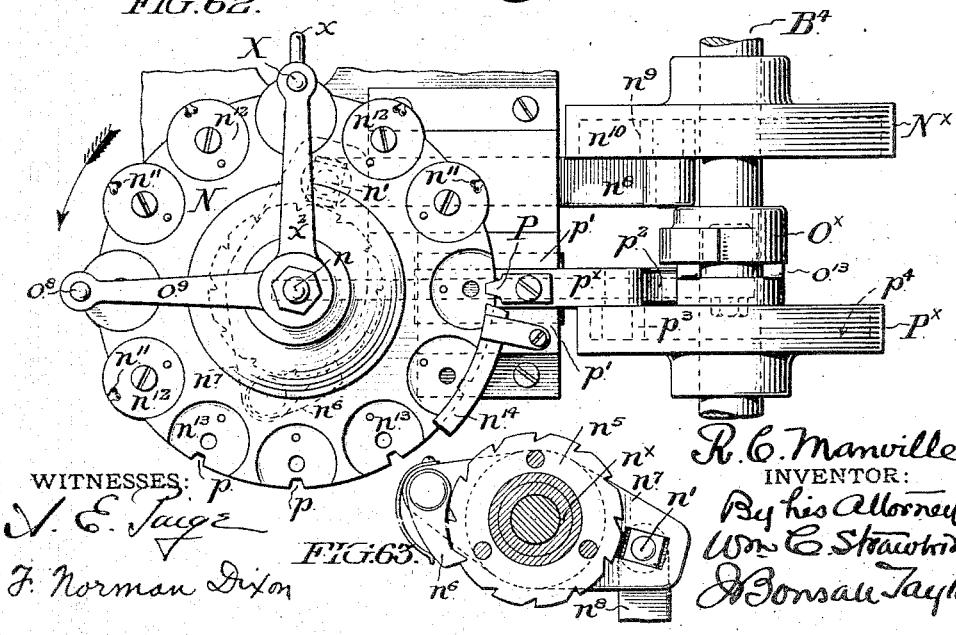

(No Model.) 23 Sheets—Sheet 20.
R. C. MANVILLE.
METHOD OF AND MACHINE FOR MAKING GARMENT HOOKS.
No. 491,289. Patented Feb. 7, 1893.
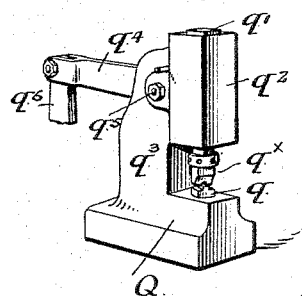
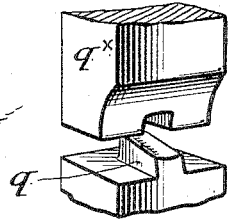
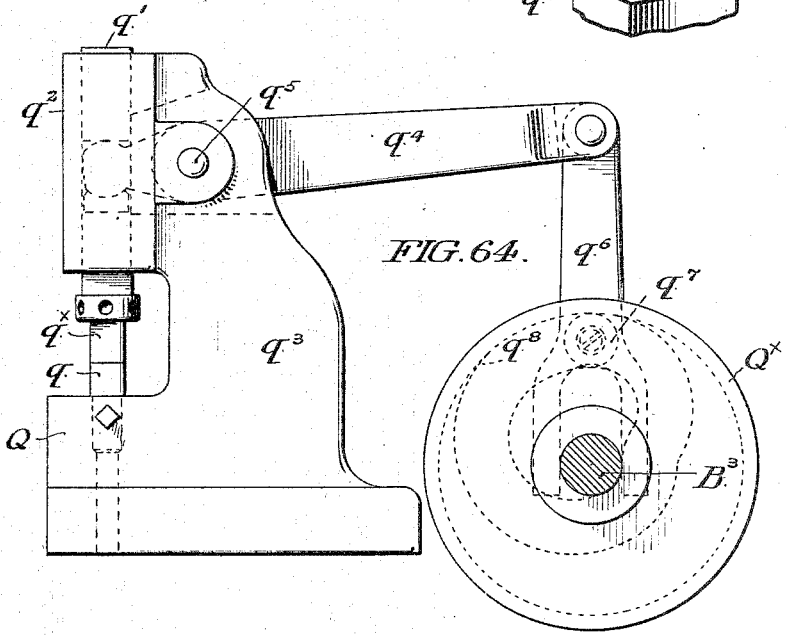
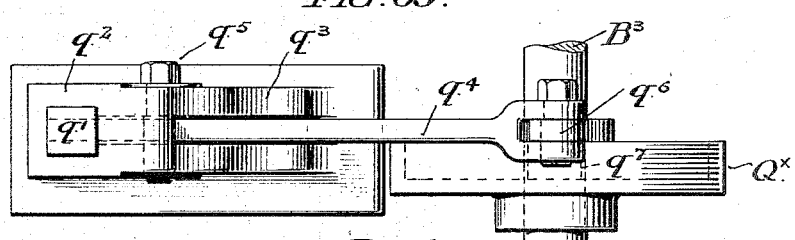
WITNESSES:
N. E. Paige
F. Norman Dixon
R. C. Manville INVENTOR:
By his Attorneys,
Wm. E. Strawbridge
Bonsall Taylor (No Model.)  23 Sheets—Sheet 21.

R. C. MANVILLE.
METHOD OF AND MACHINE FOR MAKING GARMENT HOOKS.

No. 491,289. Patented Feb. 7, 1893.

WITNESSES:
J. E. Paige
J. Norman Dixon

INVENTOR:
R. C. Manville,
By his Attorneys
Wm. C. Strawbridge
Bonsall Taylor (No Model.) 23 Sheets—Sheet 22.
R. C. MANVILLE.
METHOD OF AND MACHINE FOR MAKING GARMENT HOOKS.
No. 491,289. Patented Feb. 7, 1893.
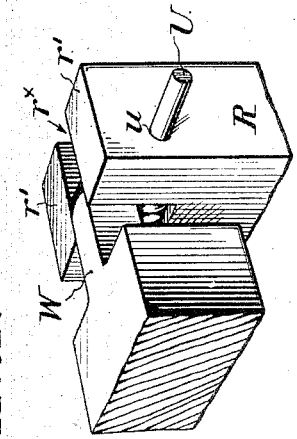
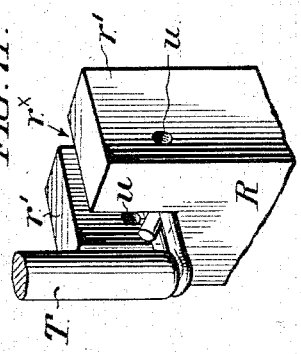
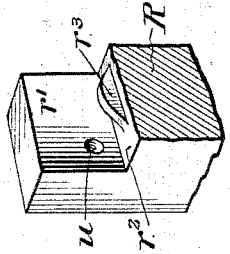
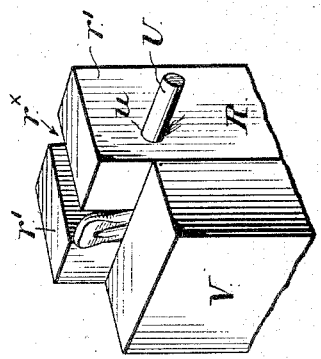
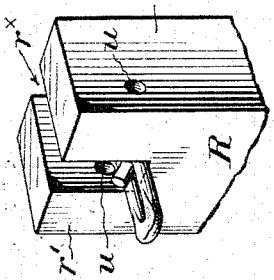
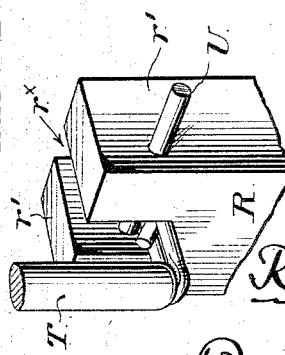
WITNESSES:
N. E. Paige
F. Norman Dixon
R. C. Manville
INVENTOR:
By his Attorneys
Wm. C. Strawbridge
J. Bonsall Taylor

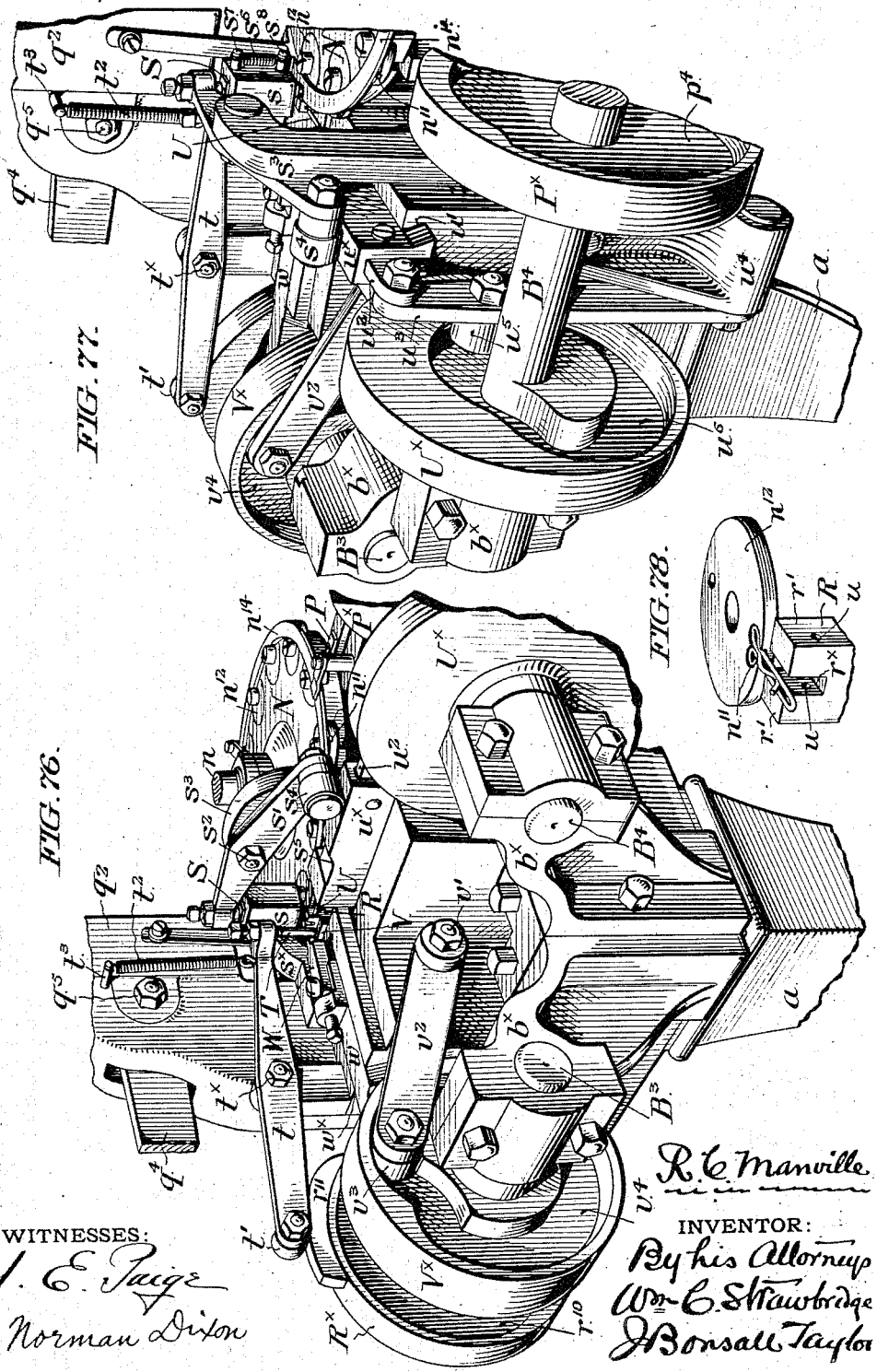

UNITED STATES PATENT OFFICE.

ROBERT C. MANVILLE, OF WATERBURY, CONNECTICUT, ASSIGNOR TO RICHARDSON & DE LONG BROTHERS, OF PHILADELPHIA, PENNSYLVANIA.

METHOD OF AND MACHINE FOR MAKING GARMENT-HOOKS.

SPECIFICATION forming part of Letters Patent No. 491,289, dated February 7, 1893.

Application filed July 20, 1892. Serial No. 440,574. (No model.)

*To all whom it may concern:*

Be it known that I, ROBERT C. MANVILLE, a citizen of the United States, residing at Waterbury, Connecticut, have invented certain new and useful improvements in methods of and in machines for manufacturing such hooks as, in connection with eyes, are used as garment-fastenings, of which the following is a specification.

It is the object of my invention to manufacture rapidly and accurately garment hooks of the character set forth in United States Letters Patent No. 411,857, granted October, 1, 1889, to Frank E. De Long.

Figure 12:
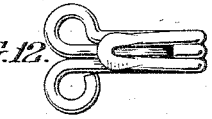
Figure 14:
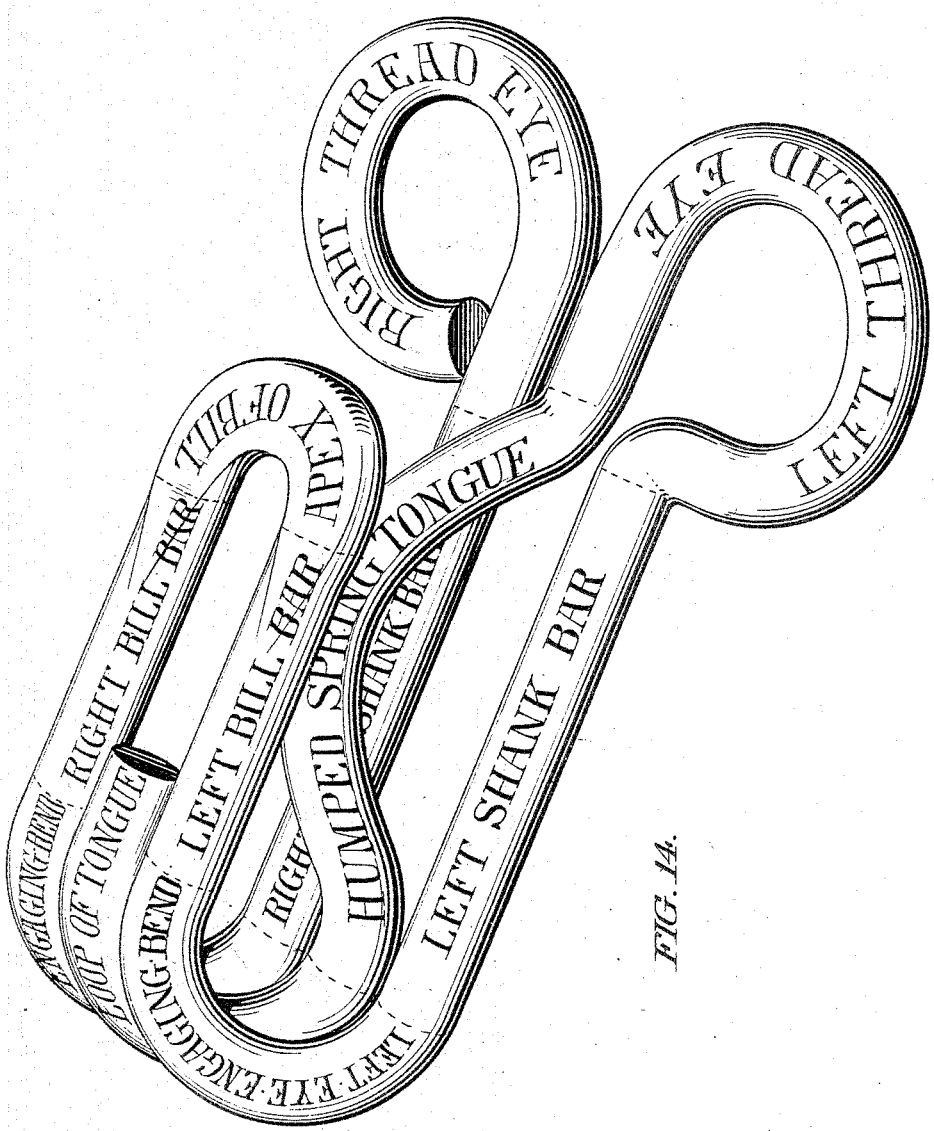

By referring to the foregoing patent, it will appear that the De Long hook is made of a single piece of wire and embodies in its construction the usual thread eyes by which it is attached to a garment, and also a shank or shank portion composed of parallel side bars, which at their outer extremities, or those farthest from the thread eyes, are bent or returned upon themselves to form the eye-engaging bends of the hook as an entirety, and are thence continued on, or, so to speak, merged, into two bars, termed the bill bars or side bars of the bill, which at their inner extremities merge into each other to form the apex of the bill, and which together with said apex constitute the bill, the beak, or the hook proper, as it is variously termed;—and also appear that between the side bars of the shank of said De Long hook there is formed a spring tongue which emanates from the thread eyes and continues within and between the confines of the shank side bars outwardly to the region where said shank bars are bent upward into the bill, and which tongue is at such region bent to form a loop which is generally correspondent with the eye-engaging bends of the hook, and which is of any desired length, but conveniently of that represented in Figures 12 and 14 of the drawings, in which it is not continued to any considerable distance inward along between the bill bars. In the De Long hook, moreover, the spring tongue is swelled, or bellied, or bent upwardly, toward the bill to form what is termed a "hump," and which is in effect a crest or swelling formed of the wire of the tongue, which partially closes the eye-space between the upper face of the shank and the under face of the bill, and slightly obstructs both the engagement and the disengagement of eye. This formation of the spring tongue into a "hump" is herein described under the coined term "humping," which is synonymous with bending to a curve.

By referring to Fig. 14 of the drawings, it will be observed that special designations as of the "right" or "left" have been applied to the lateral members of the hook which it is the object of my invention to manufacture; and that, for instance, there are both a right and a left thread eye, shank bar, eye-engaging bend, and bill bar. It will, moreover, be observed that the spring tongue is as to its bent-up portion designated by the word "hump," whereas the portions which are, for the purposes of this description, comparatively flat and which lie between the shank bars are designated by the term "spring tongue proper," or "body of the spring tongue," either of which designations is, of course, applied to the entire member, except that portion thereof which is designated as the end portion or loop, and which, for the purpose of this description, may be considered to be that portion which exists in the region of the eye-engaging bends of the hook as an entirety, without regard to the extent to which it continues longitudinally within the confines either of the shank bars or of the bill bars.

It being, as stated, the object of my improvements to manufacture the De Long hook, the description of the machinery in which my invention is embodied and by the operation of which my method is practiced, will be with reference solely to that hook and to the special members which form it. At the same time it is to be understood that other products in bent wire can be made by the operation, separately or collectively in given sequences, of elements of the machine.

The operation by which the De Long hook is made by me, is an operation which may be generally described as one of progressive bending, in the practice of which a continuous length of wire is fed into the machine and in the machine is by a series of successive and quickly recurring operations bent as to given portions to different forms, the aggregate of which is the ultimate form of the hook as an entirety.

Figure 9:
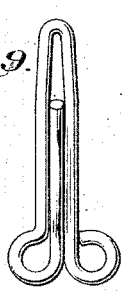
Figure 13:

To further define:—The wire, after being straightened, is, first, intermittently fed forward into the machine;—is, then, clamped and at the same time bent to the form shown in Figs. 2 and 21;—is, then, while still clamped, bent to the form shown in Figs. 3 and 23;—is, then, while still clamped, cut off to the proper length as shown in Figs. 4 and 23;—is then as to its right-angularly bent portion formed with a "hump" as shown in Figs. 5, 5ª, 24, and 26;—is, then, as to its end which has just been cut off, bent to the form shown in Figs. 6, 27, 29, and 32;—is, then, as to said end, bent to the form shown in Fig. 7;—is, then, as to its distant end, or as to that portion which in the finished product forms the spring tongue and which has been bent to form a "hump," bent to the form shown in Figs. 8, 30, 33, and 35, so that the "hump" is brought into parallelism with the shank portion against which it lies as shown in said figures;—is, then, bent midway of its body to the form represented in Figs. 9, 36, and 78;—is, then, as to its portion last bent, which ultimately forms the beak or bill, flattened to the form shown in Figs. 10, 14, 70, and 73;—is, then, as to said beak portion and also as to the terminal portion of the spring tongue which constitutes the loop, bent upwardly at right angles to the form shown in Figs. 11 and 73;—and is, then, as to said beak portion and loop portion, bent over to the form represented in Figs. 12, 13, and 14, which is the ultimate form of the product of the machine, that is to say of the finished hook.

In the accompanying drawings I have represented and herein I describe, a good form of machine embodying my invention so far as it is concerned with machinery, and adapted to effectuate my method. The subject matter which I claim as novel is recited in the claiming clauses.

The machine invented comprehends a combination or assemblage of co-operating instrumentalities, which, broadly considered, is novel as a general combination,—and also comprehends various improvements in the construction of the elements themselves, and various sub-combinations of selected elements; all as hereinafter described.

Figure 15:
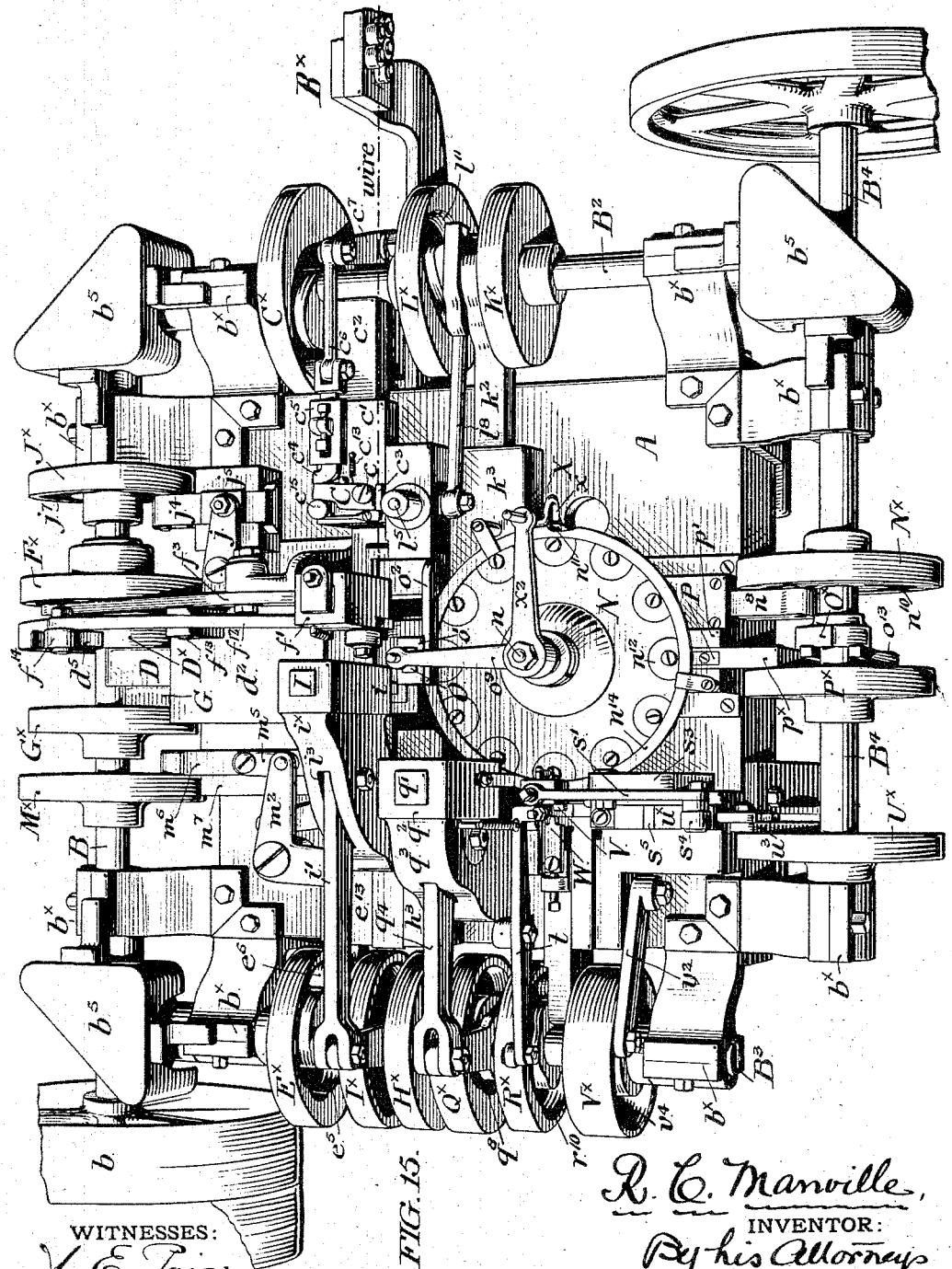
Figure 16:
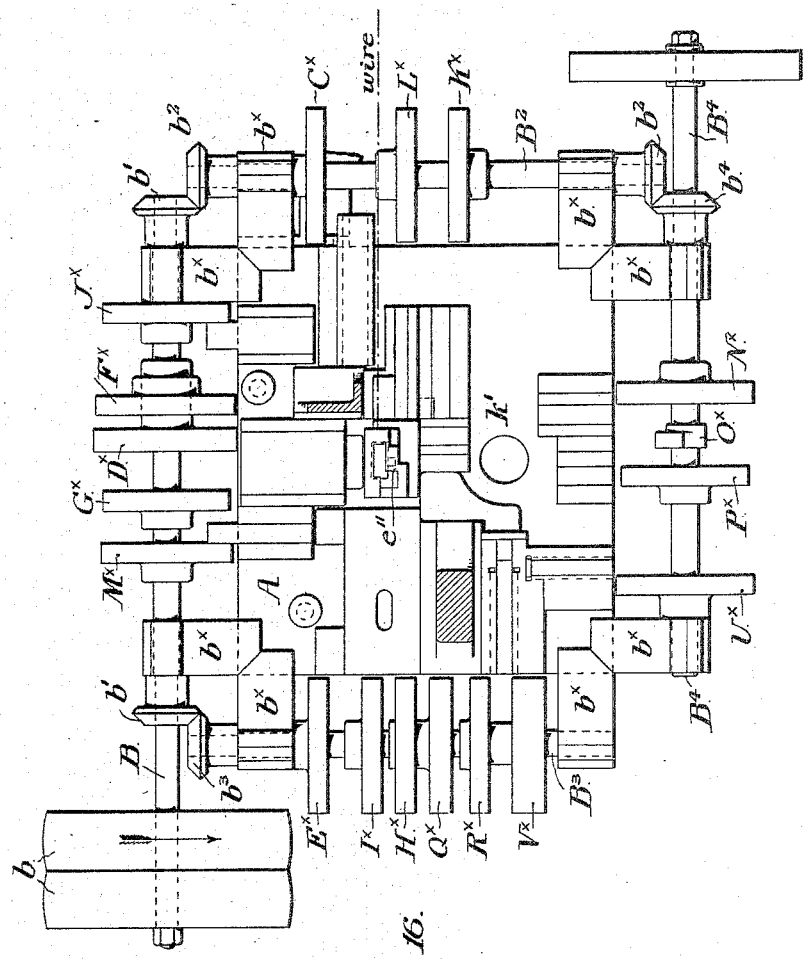
Figure 17:
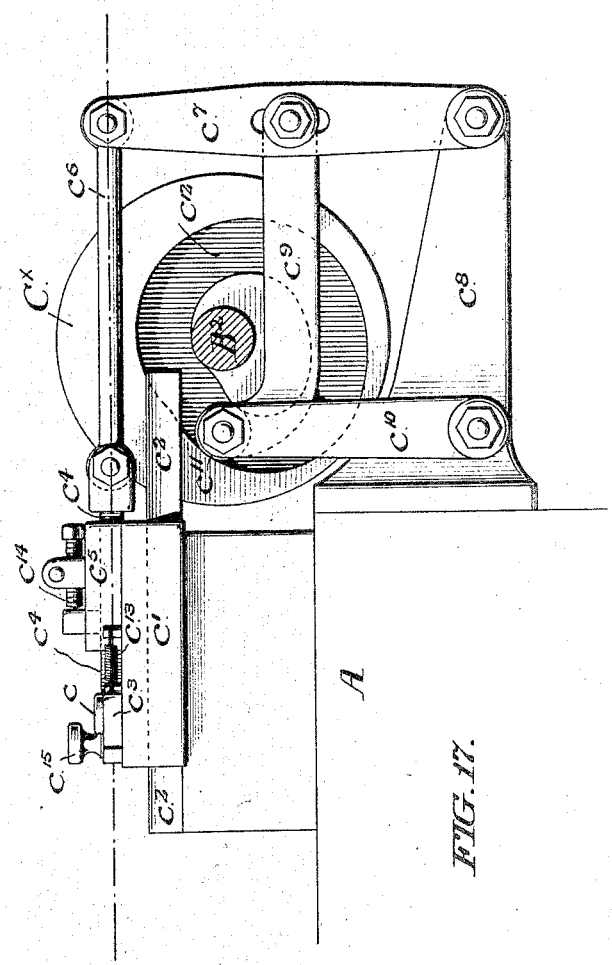
Figure 40:
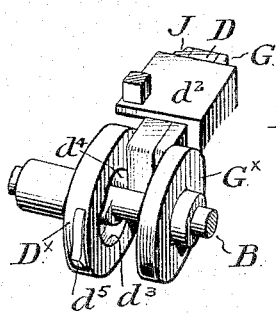
Figure 38:
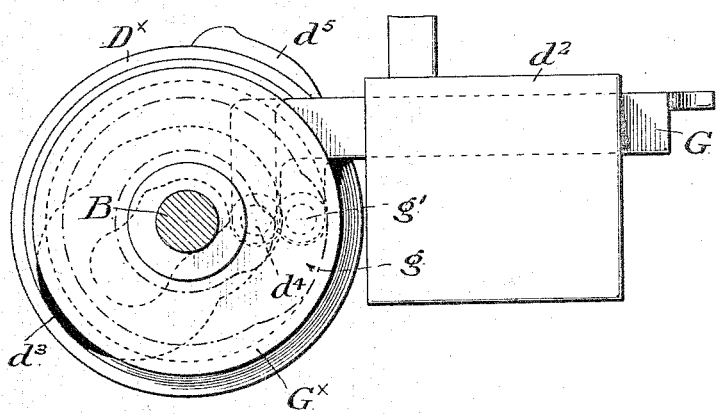
Figure 39:
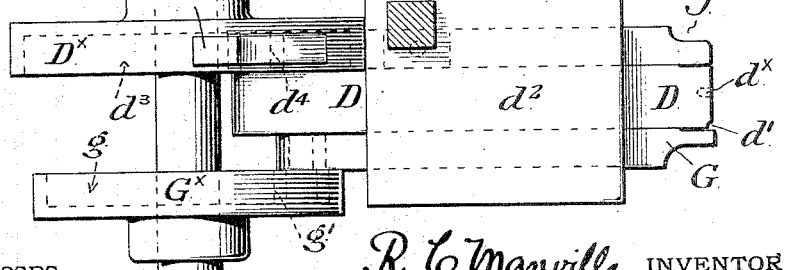
Figure 43:
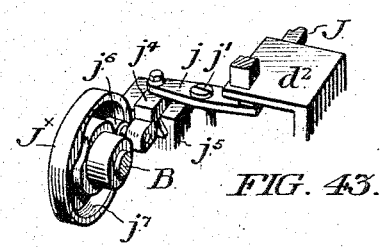
Figure 41:
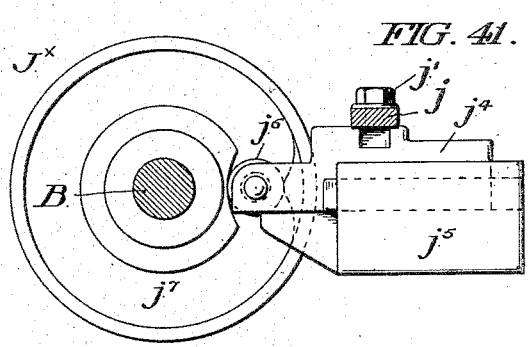
Figure 42:
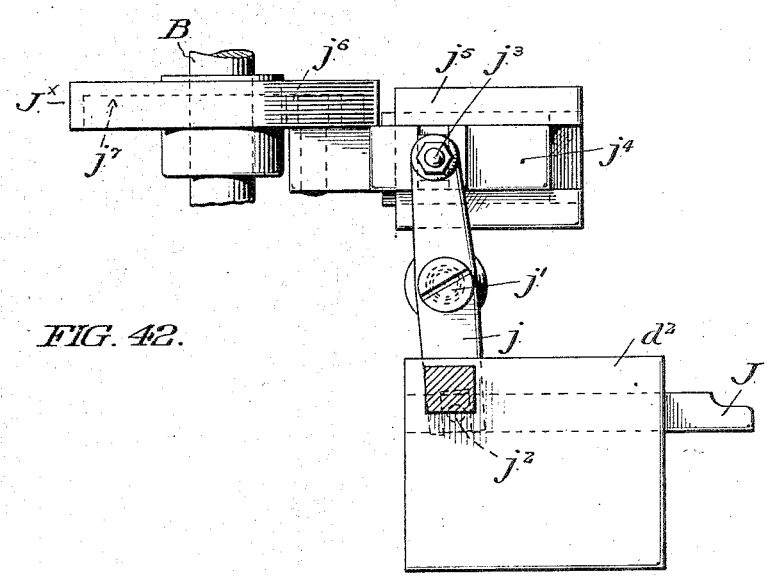
Figure 53:
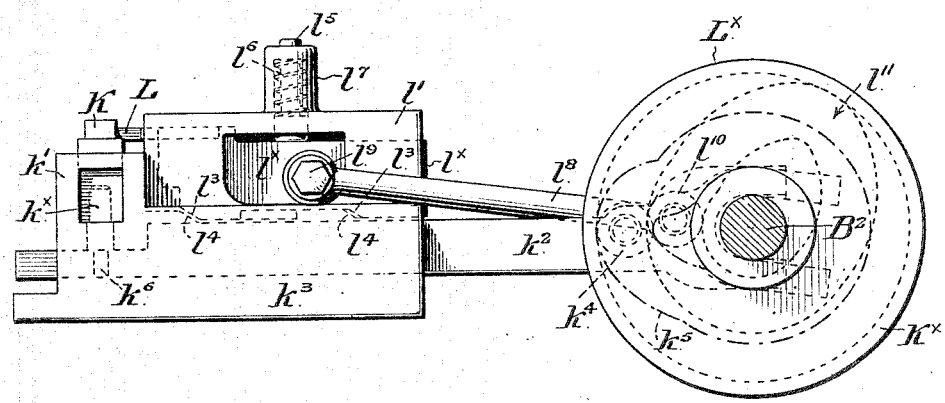
Figure 68:
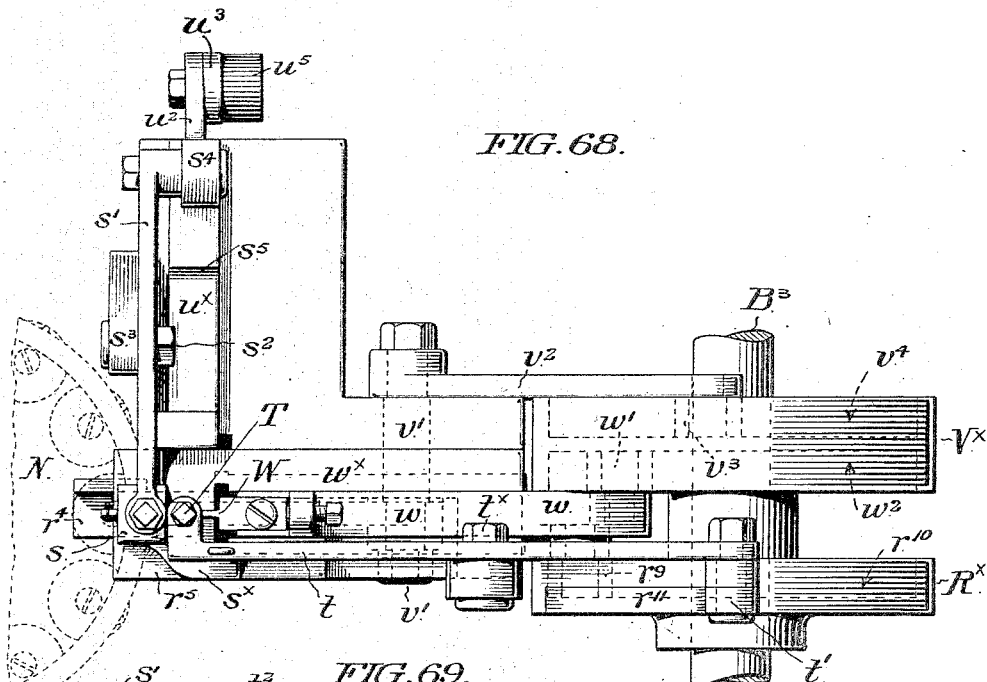
Figure 69:
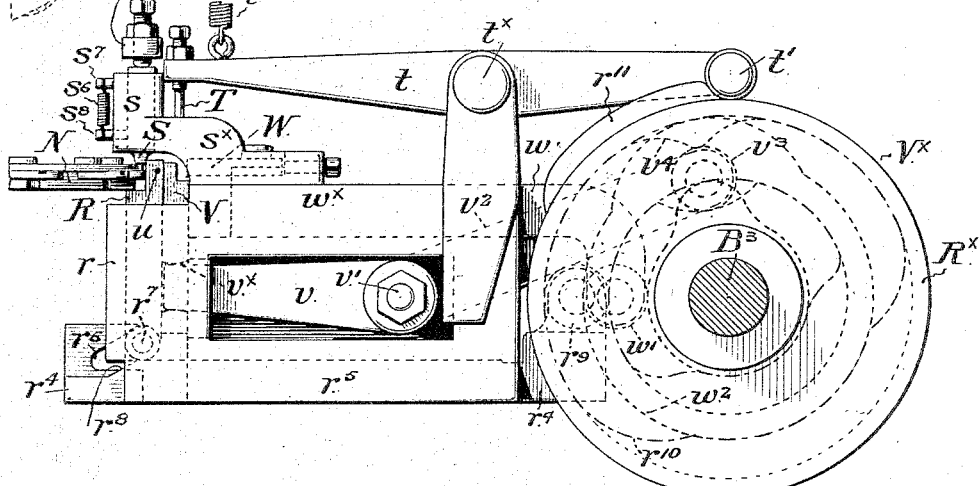

In the drawings, in which similar letters of reference indicate corresponding parts, Fig. 1 is a view of the advance extremity of the wire fed into the machine, from which a section or blank is cut off to be formed by the operation of the machine into the finished hook represented in Figs. 12, 13 and 14. Figs. 2 to 11, inclusive, are plan views of the several forms into which the wire is successively bent in the formation of the hook. All of these views are referred to in detail in the body of the specification, and, with the exception of Fig. 5ª, which is a left hand end view of the right angularly bent spring tongue represented in Fig. 5, require no special explanation at this point. Fig. 15 is a view in perspective of a machine embodying a preferred form of my improvements, sight being taken from above toward the rear. Fig. 16 is a diagrammatic plan of said machine, illustrating the arrangement of the shafts and cams, and of certain of the formative instrumentalities upon the bed plate to the operation of which the cams are active, and which perform upon the wire certain manipulations. Fig. 17 is a front elevational detail of the wire-feeding mechanism, and of a preferred form of actuating mechanism for the same. Fig. 18 is a fragmentary view in perspective,— sighted from the right hand lower corner of the machine of Fig. 15,—of portions of the wire-clamping mechanism and wire-shearing mechanism, of the wire-bending mechanisms which form the right and left thread eyes, and the "hump" of the spring tongue and which impart the initial bend to the end portion of the tongue, of the tongue-paralleling-mechanism, of the bill-forming mechanism, and of the advancing mechanism which carries the partly bent blank to the rotary carrier,—all of the parts being represented in their first positions. Fig. 19 is a fragmentary perspective detail of the guide stop which stops the advance end of the wire as fed into the machine. Fig. 20 is a view of the advance extremity of the wire which when cut off at the point indicated by the dotted line forms the blank from which the hook is made. Fig. 21 is a similar view of the blank after the initial bend which is partly formative of the left thread eye has been imparted to it. Fig. 22 is a view similar to Fig. 18 of the same parts in a subsequent position. Figs. 23 and 24 are views in perspective of forms of the blank in progressive stages of its bending to a hook. Fig. 25 is a plan view of the clamping carrier die, the pin block, the right-angling former, the lower "humping" die, the rear former, the front former, the eye-closing former, and the tongue-paralleling former, in positions, hereinafter referred to, which they occupy during given operations in the formation of the blank into a hook, the parts being represented in the positions which they occupy subsequent to the positions represented in Fig. 22. Figs. 26 and 27 are plan views of the blank in progressive stages of its bending into a hook. Fig. 28 is a view similar to Figs. 18 and 22 of the same formative parts in subsequent positions assumed by them in their operation upon the blank. Figs. 29 and 30 are perspective views of the blank in successive progressive stages of its bending into a hook. Fig. 31 is a plan view similar to Fig. 25, of the same parts, in the positions which they are shown as respectively occupying in the perspective view of Fig. 28. Figs. 32 and 33 are plan views of the blank, in the forms into which in Figs. 29 and 30 it is represented in perspective as having been bent. Fig. 34 is a view similar to Figs. 18, 22, and 28, of the same parts in the positions which they occupy in subsequent stages of the operation of bending the blank. Figs. 35 and 36 are perspective views of the blank in progressive stages of its bending. Fig. 37 is a view in perspective of one of the thread-eye-socket disks which I find it convenient to apply to the rotary carrier. Fig. 38 is a left hand side elevational view of the right-angling-former and its cam, and of the carrier-cam. Fig. 39 is a top plan view of the parts represented in Fig. 38, illustrating in addition the clamping-carrier-die and the rear-former. Fig. 40 is a view in perspective sighted from the rear, of the parts represented in Fig. 39. Fig. 41 is a left hand side elevational view of the rear-former cam and the connective mechanism through which said cam actuates the rear-former. Fig. 42 is a top plan view of the same parts, showing also the rear-former. Fig. 43 is a view in perspective sighted from the rear, of the parts represented in Fig. 42. Fig. 44 is a plan view, partly sectional, of the actuating mechanisms which control the movements of the pin block, the lower humping die, and the tongue-paralleling former, and, in part, of those which control the upper "humping" die. Fig. 45 is a top plan view of the pin block, the lower "humping" die, and of portions of the actuating mechanisms which control their movements. Fig. 46 is a view in perspective sighted from the rear, of the pin block. Fig. 47 is a right hand side elevational view of the devices represented in Fig. 45. Fig. 48 is a rear elevational view of the devices represented in Fig. 45. Fig. 49 is a rear elevational view of the upper "humping" die and of its actuating contrivances. Fig. 50 is a top plan view of the same. Fig. 51 is a view of the same in perspective. Fig. 52 is a side elevational magnified detail of the die-face portions of the upper and lower "humping" dies. Fig. 53 is a front elevational view, and Fig. 54 a top plan view, of the front-former, the eye-closing-former, and the mechanisms which actuate them. Fig. 55 is a left hand side elevational view of the wire-shearing mechanism, and of the devices which actuate said mechanism. Fig. 56 is a top plan view of the same. Fig. 57 is a perspective view of the same sighted from the rear. Fig. 58 is a perspective view sighted from the rear of certain of the devices which are associated in the advancing of the partly-bent blank to the rotary carrier, and in the seating of the same in a socket of said carrier. Fig. 59 is a fragmentary perspective view illustrative of the tappet, and of the guide way for directing the thread eyes of the partly bent blank to a socket in the carrier. Fig. 60 is a fragmentary perspective detail of the tappet-actuating hammer, and of the knock-off or hook-discharging device. Fig. 61 is a left hand side elevational view of the rotary carrier, and of the devices for mounting said carrier and occasioning its intermittent rotation, there being also represented the tappet stem and the contrivances for occasioning its vertical movement. Fig. 62 is a top plan view of the devices represented in Fig. 61. Fig. 63 is a top plan detail of the ratchet pawl, pawl lever, and lever slide, which take part in occasioning the rotary movement of the carrier. Fig. 64 is a rear elevational view of the bill-swaging mechanism. Fig. 65 is a top plan view of the same. Fig. 66 is a view in perspective sighted obliquely from the front, of the devices represented in Figs. 64 and 65. Fig. 67 is a fragmentary perspective detail of the upper and under swaging dies. Fig. 68 is a top plan view of the mechanisms which are associated for the operation of bending the bill into parallelism with the shank. Fig. 69 is a rear elevational view of the devices represented in Fig. 68. Fig. 70 is a fragmentary perspective detail of the bill-bending matrix with the partly bent blank in place. Fig. 71 is a similar view of said matrix with the bill-depressing pin in action. Fig. 72 is a view similar to Fig. 71, illustrating also the bill-bending pin in its advanced position. Fig. 73 is a view generally similar to Fig. 72, illustrating the operation of the bill-upturning former. Fig. 74 is a view similar to Fig. 73, illustrating the operation of the bill-closing former. Fig. 75 is a fragmentary and partly sectional perspective view of the bill-bending matrix, illustrating the employment of a "hump"-supporting rib upon its floor, hereinafter referred as the invention of John William Granger. Fig. 76 is a view in perspective of the various appliances represented in Figs. 68 and 69, as they appear when sight is taken from the lower left hand corner of Fig. 15. Fig. 77 is a view similar to Fig. 76, and illustrative of the same parts as they appear when viewed from the right toward the rear of the machine, as represented in Fig. 15. Fig. 78 is a fragmentary perspective view of a portion of the rotary carrier and of the bill-bending matrix in the position which the latter device occupies before action.

Before describing the construction and operation of the various instrumentalities which perform upon the wire particular work, it is proper to describe the general organization to which, in the construction of the machine, I prefer to resort:

Primarily there is a bed plate A, Figs. 15 and 16, of any preferred form, conveniently square, and conveniently supported upon legs $a$, or other preferred supports. About centrally with respect to the bed plate are conveniently assembled the primary formative instrumentalities or devices which perform upon the wire all of the operations except those of swaging or flattening the bill, of bending over the bill into its ultimate position, and of discharging the finished hook;— and these fundamental instrumentalities are operated by suitable actuating devices, preferably cams, of which, however, those represented and described are simply types which may be almost indefinitely varied at the will of the constructor, and which at best are but actuating devices to impart the required movements at the required times to the primary formative devices which in forming the wire into hooks perform upon it the actual work, such as shearing, bending, flattening, and the other manipulations involved.

In association with the foregoing assembled primary formative devices, there is applied a carrying-off mechanism which takes the partly formed hook, that is to say the hook before its bill is bent over, and subjects its beak portion preferably first to the action of flattening dies; next to the action of bending dies which bend over the beak and complete the hook; and preferably lastly to the action of a discharging device or knock-off, which discharges the completed hooks from the machine.

It being required that all of the formative devices which operate upon the wire should perform their respective offices very rapidly and yet within as small and compact a compass as possible, it is preferable to operate them from actuating contrivances somewhat remote from them and conveniently arranged around the edges or sides of the bed plate. To this end I employ a driving or master shaft $B$, Figs. 15 and 16, supported, in suitable bearings, in parallelism with one side, conveniently the back side, of the machine, and provided with driving pulleys $b$, and with beveled pinions $b'$, which engage with corresponding beveled pinions $b^2 b^3$, respectively secured to what I term the second shaft $B^2$ and the third shaft $B^3$, which shafts are parallel with each other, right angular with respect to the driving shaft, and suitably supported along the sides of the bed frame,—and which are driven shafts caused through their miter gear connections to rotate in the same direction as the driving shaft, that is to say all toward the bed plate;—and I also provide what I term a fourth shaft $B^4$, which is counter to the driving shaft, parallel therewith, supported along the front side of the machine, and conveniently actuated through a miter gear $b^2 b^4$, to take from the second shaft a similar rotation.

In the drawings I have represented the foregoing four shafts as housed in shaft bearings or boxings $b^x$, best seen in Figs. 15 and 16. Upon these several shafts, which completely inclose the bed plate as represented, I mount the actuating devices or cams above referred to, through the rotation of which I find it most convenient to impart movement to the various formative instrumentalities heretofore referred to, and I repeat that although hereinafter I particularly describe the connective mechanisms between said cams and said instrumentalities, and in fact particularly describe the cams themselves, I yet describe them as typical merely of actuating mechanisms generically considered which conveniently serve to impart the required movements to the various operated formative elements.

To further generalize:—The machine embodies the following generic instrumentalities, which perform particular work, namely:—First: A wire-straightening mechanism;—Second: A wire-feeding mechanism;—Third: A wire-clamping mechanism, which clamps the wire as fed and imparts to it its initial bending;—Fourth: A wire-shearing or dividing mechanism, which cuts off a length or blank of wire sufficient to form one hook;—Fifth: A wire-bending mechanism which forms the left thread eye, which may be termed the left-thread-eye-bending mechanism;—Sixth: A wire-bending mechanism which forms the right thread eye, which may be termed the right-thread-eye-bending mechanism;—Seventh: A wire-bending mechanism which forms the "hump" in the spring tongue and imparts the initial bend to the end portion of said spring tongue, which may be termed the tongue-conforming mechanism;—Eighth: A wire-bending mechanism which parallels the spring tongue with the left shank bar, which may be termed the tongue-paralleling mechanism;—Ninth: A wire-bending mechanism which bends the wire blank mid-way of the thread-eyes to form the apex or point of the bill, hereinafter termed the bill-forming mechanism;—Tenth: An advancing mechanism which carries the blank as formed by the operation of the bending mechanism already mentioned to a rotary carrier, or carrying-off mechanism, which feeds the blank first to a bill-swaging mechanism, second, to a bill-bending mechanism, and, third, to its point of final discharge from the machine;—Eleventh: The rotary carrying-off mechanism referred to;—Twelfth: The bill-swaging mechanism which flattens the bill;—Thirteenth: A bill-bending mechanism which bends over the bill as formed by the bill-forming mechanism and as flattened by the bill-swaging mechanism, to form the ultimate hook;—Fourteenth: A hook-discharging mechanism for delivering the finished hook from the machine.

Of the foregoing generic instrumentalities, the bill-swaging mechanism and the hook-discharging mechanism are not vital elements of the general organization and may be dispensed with, and the wire-straightening mechanism and the wire-shearing mechanism may also be dispensed with as applied to the machine, and straight wire or wire straightened in a separate straightening device, or straightened lengths of previously cut wire, be fed into the machine.

It should also here be explained that in connection with the advancing mechanism which carries the blank to the rotary carrier, I have illustrated and hereinafter refer to a device invented by John William Granger for insuring the accurate application to, or deposition within the sockets of, the rotary carrier of the partly bent blank;—and, also, that in connection with the bill-bending mechanism which bends over the bill to form the ultimate hook, I have illustrated and hereinafter refer to certain other devices, being improvements connected with the matrix bar and bill-bending pin, and being a depressing pin for holding down the apex of the bill,—all of which are hereinafter clearly distinguished,—likewise invented by the said Granger, and which together with the device first mentioned form the subject-matter of an application for patent executed and filed by him contemporaneously with this application.

Premising that the order of the operation of the foregoing essential mechanisms is preferably but not necessarily that in which they have been recited, and that all of the operations are intermittent,—I will describe the construction and operation of the said several generic mechanisms and of their associated co-operative appliances, in the order in which they have been given:—

*The wire-straightening mechanism.*—The wire is fed into the machine in the direction of the dotted line marked "wire" in Figs. 15, 16, and 18, that is to say from the right hand side of the machine. It is led from a spool through a wire-straightening mechanism, Fig. 15, of any preferred character usual in wire-bending machinery, and conveniently composite of a first series of alternated or staggered rolls disposed with their axes vertical, and of a second series of similarly arranged rolls disposed with their axes horizontal. These straightening devices being well known, I have only illustrated in said Fig. 15, at $B^\times$, a portion of such an apparatus representing the second series of the rolls. It is to be understood, however, that any straightening apparatus either connected with the machine or independent of it may be employed.

*The wire-feeding mechanism.*—From the wire-straightening mechanism the wire is led through a wire-feeding mechanism of any preferred character, but conveniently of the following construction: Referring to Figs. 15 and 17, C is a clamping lever, pivoted at $c$ upon what I term a feed slide $c'$, which is adapted to be reciprocated longitudinally of the bed plate upon a slide way $c^2$ integral with or connected to the bed plate. The wire to be fed is passed between the inner end of the clamping lever, which is conveniently roughened, and what I term a clamping abutment $c^3$ fixed upon the feed slide. Obviously, when the clamping lever occupies the position represented in Fig. 15 the wire passed between it and the abutment will be clamped. The throw of the lever necessary to effect this clamping is conveniently accomplished by a lever slide $c^4$ housed in a slide bearing $c^5$ carried upon the feed slide $c'$, which slide is actuated to its advance by a link $c^6$ connected with a vertical rocker $c^7$, Fig. 17, pivoted at its lower extremity to a bracket $c^8$ or other fixed support, and deriving its throw through the intervention of a connecting bar $c^9$ from a second rocker $c^{10}$ likewise at its lower extremity pivoted to the bracket $c^8$, and at its upper extremity equipped with a lateral cam roll $c^{11}$, which plays in a laterally sunken cam way $c^{12}$ formed in what I term the feed cam $C^\times$, mounted on the second shaft $B^2$. The rotation of the feed cam $C^\times$ occasioning, as it will, the simultaneous operation of both of the rockers, the lever slide $c^4$ will, through its link $c^6$, be correspondingly operated, with the result that in its advance it will occasion, first, the deflection of the clamping lever until it binds the wire against the abutment, and, second, the advance of the entire feed slide to an extent sufficient to feed forward into encounter with the guide stop $e^{16}$, Fig. 19,—a portion of the wire of the length required for the formation of one hook;—while in its retreat it will first release its grip upon the clamping lever, and permit the returning spring $c^{13}$ of said lever to return it to its normal position which is not in bite with the wire, and will then occasion the retraction of the feed slide $c'$ to its first position. The set of the lever slide $c^4$ can be adjusted by the aid of the adjusting screw $c^{14}$, and, when desired, the clamping lever C may be locked out of action by the operation of a cam-button $c^{15}$ in a way well understood by mechanics, and not requiring further explanation.

*The wire-clamping mechanism.*—From between the clamping lever and its abutment of the wire-feeding mechanism, the wire is led through a guide throat, $f$, Fig. 18, formed in the lower extremity of the shears carrier, whereof hereinafter, across the face of the clamping carrier die D, which performs the three functions of, first, clamping the body portion of the wire blank between the thread-eye portions, against the pin block, of, second, co-operating with the apex pin of the pin block to bend the wire blank mid-way of its body portion to form the apex or point of the bill, and of, third, advancing the blank so bent to the rotary carrier which transports it to the bill-swaging and bill-bending mechanisms,—accomplishing such functions by three successively occurring advance movements which are followed by a single movement of retreat to its normal position in the organization. This clamping carrier die D, represented in Figs. 18, 22, 25, 28, 31, 34, 38, 39, 40, and 58, is conveniently constructed as a flat plate of metal, across the front face of which is a clamping groove $d$, in registry with which the wire passes from the guide throat $f$, and within which front face and bisecting which groove, is an apex-bending recess $d^\times$ into which the wire is forced by the advance of said carrier die against the apex pin $e^3$ of the pin block, as hereinafter explained. The left hand front corner of this carrier die D is formed with a vertical segmental cylindriform eye-bending notch $d'$, which co-operates with a vertical thread-eye-pin $e^4$ erected from the pin block, to impart to the wire blank at the instant that it is clamped between the carrier die and the pin block, an offset or quarter bend or turn of the character represented in Figs. 2 and 21, which is the initial bend imparted to the wire as fed, and a bend which forms part of the left thread eye. The carrier die is housed for its advancing and retreating movements within a housing $d^2$, springing from the bed plate and serving also to house the right-angling former G and the rear former J, whereof hereinafter. The several movements imparted to the carrier die may be variously occasioned. I prefer to occasion them by the operation of a carrier cam $D^\times$, Figs. 15, 16, 38, 39, and 40, mounted upon the driving shaft B, and within a properly conformed lateral cam way $d^3$ in which is engaged a cam roller $d^4$ applied laterally to the rear extremity of said carrier die where the latter projects to the rear beyond its housing. The path of the cam-way $d^3$ is such as to occasion three predetermined movements of intermittent advance, respectively succeeded each by a "dwell," and one movement of uninterrupted retreat, and its outline is represented in Figs. 38 and 40. Co-operating with the clamping carrier die is the pin block E, an abutment die of the form represented in Figs. 18, 22, 25, 28, 31, 34, 44, 45, 46, 47, and 48, and susceptible of an up and down movement to cause it in the initial feed of the wire to occupy the position represented in Fig. 18, and serve as an abutment against which the clamping carrier die may clamp the wire, and also to cause it, after the thread-eyes have been formed upon the blank, and the spring tongue has been "humped" and paralleled with the left shank bar, as hereinafter explained, to occupy the position represented in Fig. 31, in which its clamping surface has sunk below the front face of the clamping carrier die, and its apex pin is presented to the apex-bending recess $d^\times$ in the front face of said carrier die. The upper surface of the pin block, as shown in Figs. 46, 47, and 48, occupies two levels, of which the upper level is designated $e$ and the lower level $e'$, and a vertical wall $e^2$, is connective, so to speak, of the two levels, and constitutes the abutment face of the block against which the carrier die performs its action of clamping the wire. Upon the upper level $e$ of the pin block is erected the apex pin $e^3$, about which, in the advance of the carrier die, the wire blank is bent by the apex-bending recess $d^\times$ to form the apex of the bill; and upon the lower level is erected a cylindriform thread-eye pin $e^4$ which co-operates with the eye-bending notch $d'$ of the carrier die to form the initial bend in the wire represented in Figs. 2 and 21, and which also co-operates with the right-angling former G and with the tongue-paralleling former M to occasion the completion of the formation of the left thread eye of the hook, as hereinafter explained.

Many contrivances to occasion the predetermined lift and drop of the pin block may be resorted to. I find it convenient to occasion these movements by the following means: $E^\times$ is a pin-block-operating cam, Figs. 15, 16, and 44, mounted upon the third shaft $B^3$ and embodying a suitably conformed lateral cam way $e^5$ within which is entered a lateral cam roller $e^6$ applied to the rear extremity of a longitudinally moving cam slide $e^7$, Fig. 44, which, in its reciprocation, through the medium of a link $e^8$, occasions the throw of a lever which I term the pin block lever $e^9$, which is pivoted at $e^{10}$, to the bed plate, and the outer extremity of which is pivotally connected at $e^{11}$ to a pin-block-operating slide $e^{12}$, all as shown in Fig. 44. This slide $e^{12}$ is maintained in a housing $e^{13}$ formed on the bed plate, Figs. 15 and 44, and its inner extremity, as shown in Fig. 48, is provided with an inclined cam slot $e^{14}$ of suitable configuration, which receives a lifting pin $e^{15}$, conveniently roller-equipped, and projecting laterally from the basal portion of the pin block below its bearing $e^\times$ in the bed plate, as shown in Fig. 47.

*The wire-shearing mechanism.*—After the wire has been clamped between the clamping carrier die and the pin block, and the initial bend which in part forms the left thread-eye has been imparted to it, as already explained, the shearing or cutting-off mechanism, shown in Figs. 15, 55, 56, and 57, which severs the portion of wire so clamped and bent to the length required for the formation of one hook, comes into action. F is a shears carrier, Figs. 18, 22, 28, 34, 55, 56, and 57, being a vertical slide through the lower extremity of which is formed the transverse guide throat $f$, a hole of approximately the diameter of the wire, through which, as stated, the wire is led to the clamping mechanism. This shears carrier is housed in a bearing $f'$ conveniently carried upon a standard $f^2$ springing from the bed plate, and to it is imparted an intermittent up and down motion which is conveniently produced by the action of a shears carrier cam $F^\times$ upon the driving shaft, acting through a lever $f^3$, which may be termed the shears carrier lever, and which is fulcrumed at $f^4$ in the standard $f^2$, as to its front extremity is engaged within a lever slot $f^5$ in the shears carrier, and at its rear extremity is laterally equipped with a cam roller $f^6$ engaged within a suitably conformed lateral cam-way $f^7$ formed in said shears carrier cam $F^\times$. This cam $F^\times$ is timed to occasion the lift of the shears carrier F before the advance of the front former K and the rear former J, whereof hereinafter. Pivoted to the inside face of the shears carrier at $f^8$ is a shears $f^9$, conveniently formed as a downwardly-depending knife, playing closely against the side face of the carrier, and performing its shearing operation with respect to the guide throat $f$ as its companion blade. It is provided with a rearwardly-extending angular shears arm $f^{10}$, normally maintained by the action of a shears spring $f^{11}$ in the position represented in Fig. 57, but adapted, as shown in Fig. 55, to be deflected downwardly to occasion the forward throw and shearing action of the shears blade upon the stroke of a hammer-like lever, which I term the shears lever $f^{12}$, which is fulcrumed at $f^{13}$ upon a standard conveniently springing from the housing $d^2$ of the clamping carrier die, the rear extremity of which lever is equipped with a cam roller $f^{14}$ which treads upon the periphery of the carrier cam $D^\times$, which, as explained, actuates the clamping carrier D, and which as to its said periphery is equipped with a cam crest $d^5$ to perform the tilting throw required.

*The bending mechanism which forms the left thread eye.*—In the embodiment of my improvements represented in the accompanying drawings, the actuating cams are so timed as to occasion the partial formation of the left thread-eye, and the "humping" of the spring tongue, in advance of the time of the formation of the right thread-eye and the subsequent paralleling of the tongue with the left shank bar to complete the left thread-eye. It is proper, therefore, now to describe these actions, although it is to be understood that the timing of the machine may, without departure from the invention, be altered to occasion the formation of the right thread-eye in advance of the left. As heretofore explained, the initial bend which is formative of a portion of the left thread eye and represented in Figs. 2 and 21, is accomplished simultaneously with the advance of the clamping carrier die to clamp the wire blank. The next operation performed in the aforesaid connection, is the deflection to the right-angular position represented in Figs. 3, 4, and 23, of the advance end of the wire beyond the initial bend, that is to say, of that portion of the wire which completes the left thread eye and forms the spring tongue and the loop of the tongue, and this deflection is conveniently accomplished by the following devices: G is what I term a right-angling former. It is represented in Figs. 15, 18, 22, 25, 28, 31, 34, 38, 39, and 40, and is a slide or plate of metal housed to the left of the clamping carrier die D within the housing $d^2$. This former in its advance co-operates with the thread-eye pin $e^4$ to impart to the advance end of the wire blank the right-angular bend represented in Figs. 3 and 23. The advance and retreat of the said former may be variously occasioned. I find it convenient to occasion these movements by the operation of what I term the right-angling former cam $G^\times$ Figs. 15, 16, 38, 39, and 40, upon the driving shaft, within a properly conformed lateral cam way $g$ in which is entered a cam roller $g'$, laterally projecting from the rear extremity of the former G where it projects beyond its housing, as shown in Figs. 15, 38, and 39. The right-angular bending imparted to the end of the wire by the advance of the right-angling former disposes and temporarily locates the free end of the wire blank above the lower "humping" die II, best seen in Figs. 22, 25, 31, and 52, and below the upper "humping" die I, which respectively approach each other to form the completed "hump" in the spring tongue and also the first partial bending of the end portion of said tongue which is subsequently bent completely over to form the loop of said tongue. The lower "humping" die II, is formed with a "hump" $h$, Fig. 52,—to which a correspondent recess in the upper "humping" die conforms; and, also, to the front of said "hump," is formed with an upward incline $h^\times$ conforming to a similar reverse incline upon the upper die and which imparts the first bending to the end portion of the tongue. The lower "humping" die is, as shown in Figs. 25, 31, and 45, disposed at right angles to the pin block, and is housed and fitted for vertical movement within the bearing $e^\times$, which likewise houses the pin block. The said vertical movement may be occasioned by any preferred means, but I find it convenient to occasion it,—see Figs. 44, 45, 47, and 48,—by means of a reciprocating slide $h^2$, housed in a suitable housing $h^3$, and at its outer extremity equipped with a cam roller $h^4$ which engages within a suitably conformed lateral cam-way $h^5$ in what I term the lower "humping" die cam II$^\times$, mounted upon the third shaft B$^3$. This slide is at its inner extremity provided with a lifting incline $h^6$, Fig. 48, which bears against a corresponding opposite incline $h^7$ formed in the lower extremity of the lower "humping" die, and is also provided with a laterally-projecting depressing pin $h^8$ which is entered within an oblique slot $h^9$, conveniently formed in a vertical foot web $h^{10}$ which projects from the lower portion of the lower "humping" die. The initial throw of the reciprocating slide $h^2$, acting through its lifting incline $h^6$ against the incline $h^7$ upon the bottom of the die, occasions the elevation of said die, while the action of the depressing pin of the slide within the oblique slot of the die in the retreat of the slide occasions the depression of said die. These contrivances are, however, but typical of many mechanical movements which can be employed to occasion the predetermined up and down movement of said lower "humping" die. I, Figs. 18, 22, 28, 34, 49, 51, and 52, is the upper "humping" die, movements of which correspondingly opposite to those of the lower die may be conveniently occasioned by many devices, of which the following have been found to be effective:—The upper "humping" die has vertical movement within a housing $i$ conveniently sustained upon a standard $i^\times$ springing from the bed plate, and it is operated by a die lever $i'$ conveniently fulcrumed at $i^2$ within a transverse vertical slot $i^3$ formed in the standard $i^\times$, as shown in Figs. 15 and 49,—which lever as to its inner extremity abuts between die lugs $i^4$ projecting from said die, and as to its outer extremity is pivoted at $i^5$ to a cam pitman $i^6$, Fig. 49, which is provided with a laterally-projecting cam roller $i^7$ entered within a lateral cam way $i^8$ formed in what I term the upper "humping" die cam I$^x$, mounted on the third shaft B$^3$. As a contrivance to insure the constant vertical maintenance of the cam pitman $i^6$, I prefer to form its lower extremity into a fork $i^9$ which straddles the third shaft, as shown in said Fig. 49. The timing of both the lower "humping" die cam H$^x$, and the upper "humping" die cam I$^x$, and the paths of their respective cam ways, are intentionally so ordered and conformed as to occasion the simultaneous approach and simultaneous recession of said respective dies, to the end that they may effect the described bending of that portion of the wire which has been presented to them, and which in the ultimate hook is to constitute the spring tongue and the loop of said tongue.

Figure 54:
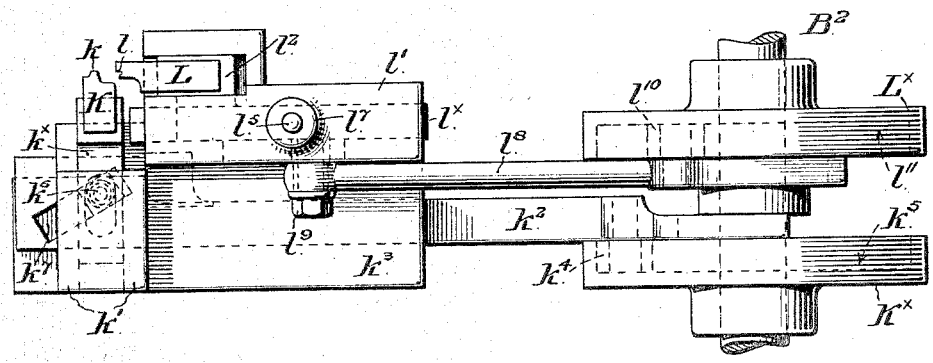

*The bending mechanism which forms the right thread eye.*—The right thread-eye is the eye formed upon the rear end of the wire blank. The blank being still clamped between the clamping carrier die and the pin block, as supposed in Fig. 25, its terminal extremity projects a sufficient distance to the right of the pin block to present itself to the action of a pair of transversely-disposed correspondingly and oppositely acting eye-bending formers, which I term for brevity the front former K and the rear former J. These formers are represented in Figs. 25, 28, 31, and 34,—occupying in Figs. 28, and 31, their normal position of rest before and after their mutual approach to the position represented in Fig. 25. Describing first the rear former J, shown in Figs. 25, 31, 42, and 43,—it will be observed that the right hand corner of its front or acting face is cylindriform to permit of the bending around it to a quarter turn of the wire which before the mutual approach of the said dies projected longitudinally across its face and to the right beyond said corner. The rear former itself, Figs. 42, and 43, is housed in the bearing $d^2$, already described, which houses the clamping carrier die D, and its reciprocating movement may be imparted to it in many ways. I find it convenient, however, to impart it by the action of a rear former lever $j$, fulcrumed at $j'$, upon a fulcrum pin erected from some fixed support, and engaged at its inner extremity with the rear former by an appropriate pivotal connection $j^2$, and at its outer extremity connected by a similar connection $j^3$ with a former slide $j^4$, adapted for transverse reciprocation within an appropriate slide bearing $j^5$ mounted upon the bed plate, and at its rear extremity provided with a lateral cam roller $j^6$ entered within a suitably conformed lateral cam-way $j^7$ in what I term the rear former cam J$^x$ mounted upon the driving shaft. The front former K,—Figs. 18, 22, 25, 28, 31, 34, 53, and 54,—is, by means of a projecting shoulder $k$, as to its acting face conformed to the acting face of the rear former and adapted in the mutual approach of said formers to impart to the wire its quarter bend or turn around the cylindric right hand corner of said rear former, as around a die, to impart to said end of the wire the form represented in Figs. 6, 27, 29, and 32. The reciprocation of the front former may be accomplished by any preferred means,—I however find it convenient to accomplish it by the following devices. The front former, as shown in Figs. 53 and 54, is carried upon a transversely moving former slide $k^x$, housed in suitable ways $k'$ erected from the bed plate; and it has right angular movement over and with respect to the inner extremity of a cam slide $k^2$, adapted for reciprocation within a slide housing $k^3$ on the bed plate, and actuated at its outer extremity by what I term the front former cam K$^x$, mounted on the second shaft, through the intervention of a cam roller $k^4$, which projects laterally from said outer end of said cam slide into a suitably conformed lateral cam way $k^5$ formed in said front former cam. The connection between the front former slide $k^x$ and the cam slide $k^2$, by which the longitudinal reciprocatory movement of said cam slide is converted into the transverse reciprocatory movement of the front former slide, is through a lug $k^6$ projecting downwardly from the under surface of the front former slide and entered in any preferred mechanical manner within an oblique slide $k^7$ formed in the cam slide. The timing of the rear former cam J$^x$ and also of the front former cam K$^x$, is intentionally such as to occasion the corresponding opposite movements of the rear former and the front former. So much of the right thread-eye as is formed by the right-angular bend imparted to the rear end of the wire blank by the operation of the front and rear formers, as just described, is represented in Figs. 6, 27, 29, and 32, and in order to complete the eye to the form represented in Figs. 7, 30, and 33, it is obviously necessary to turn over the angularly-turned extremity of the blank, or close it upon itself. This up-setting or turning over action is accomplished without the aid of a pin or kindred internal former by the advance, subsequent of course to the mutual retreat of the front and rear formers, of what I term the eye-closing former L, Figs. 25, 28, 31, 53, and 54, a die-like slide adapted for longitudinal reciprocation, and as to its inner or acting face provided with a semicircular bending recess $l$, Figs. 25 and 31. During the approach of the front and rear formers, this eye-closing former occupies a position clear of them to the right, as shown in Fig. 25, and its advance does not, as explained, take place until after their recession to the position represented in Fig. 31. When, however, said advance does take place, the angularly-turned extremity of the wire blank is engaged by the recess $l$ and forced around in advance of the former to complete the formation of the right thread-eye, as shown in Figs. 7, 30, and 33. By referring to Fig. 28 it will be observed that the eye-closing former occupies a position immediately beneath the shears carrier F, which, as already explained, has vertical movement between the successive feeds of the wire, temporarily rising after the feed has been completed and the shearing action has taken place. Inasmuch as it is important in the feed of the wire to maintain the guide throat $f$ of the shears carrier in line with the clamping groove $d$ of the clamping carrier die, it is obvious that the eye-closing former must during such period be out of the way of the shears carrier,—while it is equally obvious that in order to perform its own work in the completion of the formation of the right thread eye said former must for its own successful operation itself be in practical alignment with the clamping groove of the clamping carrier die,—and I, therefore, find it convenient to adapt the eye-closing former not only to reciprocate but also to rise to a given level and subsequently to sink below said level. This entire movement, however, is one which is an expedient of construction and peculiarly applicable in the special organization represented. It forms no vital part of the invention, and the organization of the machine may be such that the up and down movement of the former may be dispensed with. The compound movement referred to which in the organization under description is imparted to the eye-closing former, may be variously brought about. It may be conveniently done in the following manner:—The eye-closing former L is mounted upon a former slide $l^x$ represented in Figs. 53 and 54, and fitted within an appropriate housing $l'$ upon the bed plate. The slide consists of a body to which the letter $l^x$ is applied, and of a lateral extension $l^2$, Fig. 54, to which the eye-closing former L is directly applied. The housing is correspondingly conformed and such as to permit not only of the longitudinal but also of the vertical movement of the former slide. The vertical movement is, as shown in Fig. 53, conveniently effected by forming upon the lower face of the former slide an incline or inclines $l^3$ which register with respect to corresponding opposite inclines $l^4$ formed upon the floor of the housing. Obviously, as the slide is advanced, it and its former are caused to rise, while as said slide is withdrawn, both are caused to sink, their downward movement being assured by the provision of a depressing stud $l^5$ controlled by a compressing spiral or other spring $l^6$, conveniently contained within a tubular socket $l^7$ formed as a part of the housing $l'$. The reciprocating movement which is accompanied by the rise and fall spoken of, is conveniently accomplished by a cam pitman $l^8$, at its inner end pivoted at $l^9$ to the former slide, and at its outer extremity provided with a lateral cam roller $l^{10}$ adapted to a suitably conformed lateral cam way $l^{11}$ formed in a cam which I term the eye-closing former cam $L^x$, mounted upon the second shaft $B^2$. The timing of this cam is intentionally such as to occasion the operation of the eye-closing former in the intervals between the operation of the front and rear formers.

*The bending mechanism which parallels the spring tongue with the left shank bar.*—After the forming of the "hump" and the initial bending of the loop in the manner and by the devices heretofore described, and after, moreover, the formation of the right thread eye, as last above described, the next action is that of the instrumentality which bends the "humped" spring tongue into parallelism with that portion of the body of the wire blank which in the completed hook constitutes the left shank bar, as shown in Figs. 8, 30, 33, and 35,—and this bending is accomplished by what I term the tongue-paralleling former M, represented in Figs. 18, 22, 25, 28, 31, 34, and 44, which co-operates with the thread-eye pin $e^4$ to bend the tongue from the position represented in Fig. 5 into that represented in Fig. 8. This tongue-paralleling former is a longitudinally-operating die, but one which operates at right angles to the clamping carrier die D and the right angling former G. It is conveniently constituted as a horizontally disposed bar of metal to which the letter M is applied, and which is conveniently socketed with respect to, and secured by a set screw to, a reciprocating former slide $m^x$ housed in suitable ways $m'$ formed in the bed plate, and adapted to be reciprocated by the oscillation of a bell crank lever $m^2$ pivoted at $m^3$ to the bed plate, the transverse arm of which is by a stud $m^4$ connected with said slide, while its longitudinal arm is linked by a link $m^5$ to a transversely reciprocating cam slide $m^6$ housed in ways $m^7$ formed in the bed plate, which at its rear extremity is equipped with a lateral cam roller $m^8$ entered within a suitably conformed lateral cam way $m^9$ formed in what I term the tongue-paralleling former cam $M^x$ mounted upon the driving shaft B. Obviously the rotation of this cam, occasioning the reciprocation of the cam slide, and, through the link, the consequent oscillation of the bell crank lever, will occasion the predetermined reciprocation of the former slide and tongue-paralleling former, with the result that in the advance of the latter the "humped" portion of the wire will, as explained, be brought into parallelism with the left shank bar portion of the hook body and upon the retreat of said former will be left in such position.

*The bill-forming mechanism.*—Having now described the manner in which the wire is fed to the machine, cut off to form a blank of suitable length to make one hook, formed with thread eyes, and then formed with a "humped" spring tongue terminating in a partially formed loop,—the next operation to which the said blank is subjected is an operation of bending its body midway of its thread eyes to form the apex or point of the bill, an operation accomplished by what I term the bill-forming mechanism, a convenient embodiment of which is the following:

As heretofore explained, the wire blank, during the period of the operation of the formative devices which cut it off and form its thread eyes and its "humped" tongue, is clamped between the clamping carrier die D and the pin block E, in which position the apex pin $e^3$ upon the upper level of the pin block occupies the position represented in Figs. 22 and 28, and is above the apex-bending recess $d^x$ formed in the front face of the clamping carrier die. The first step in the operation of the bending of the bill to form its apex or point, in consequence, involves such predetermined descent or sinking of the pin block, under the operation of its actuating contrivances heretofore described, as will permit of the passage of the clamping carrier die to a given distance forward across its upper level, and at the same time as will occasion the presentation of the apex pin $e^3$ to the apex-bending recess $d^x$, as represented in Fig. 31. As already explained, the first advance of the clamping carrier die occasions only the clamping of the wire of the blank, but the second advance, which is the one which takes place after the sinking of the pin block as above described, is of such extent as to cause the apex-bending recess to be entered over, or, so to speak, to envelop the apex pin, with the result that the blank which prior to the second advance of the carrier die referred to has been shaped to the form represented in Fig. 8, will be bent about the apex pin to the form represented in Fig. 9, or in such manner that the two equal lengths of wire which subsequently respectively form the right bill bar, the right eye-engaging bend, and the right shank bar, and also the left bill bar, the left eye-engaging bend, and the left shank bar, will have been brought into substantial parallelism, and will include between them the spring tongue with its completely formed "hump" and its partly formed terminal loop, as represented in said Figs. 9 and 36. The blank, bent as aforesaid, will then for the time being be wedged within the apex-bending recess of the carrier die, and the next movement, which takes place before the third or final advance of said carrier die, will be the predetermined sinking or descent of the pin block from the position which it is represented as occupying in Figs. 18, 22, and 28, to the position represented in Fig. 31, a position which permits of the clearance by the carrier die of the apex pin, in the final advance of said carrier die represented in Fig. 34.

*The advancing mechanism which carries the blank forward to the rotary carrier.*—Assuming that the pin block has sunk to the position represented in Fig. 31, the third or final advance of the clamping carrier die under the operation of its actuating mechanism immediately takes place, and is an advance, depicted in Fig. 34, predetermined to occasion the superimposition of the thread eyes of the blank over a thread-eye socket in the rotary carrier, which in the then position of the parts presents itself for the reception of said thread eyes. The particular thread-eye socket which, as shown in Fig. 58, happens to present itself to the bent blank, is one of a series of sockets disposed about the periphery of a rotary carrier, Figs. 15, 58, and 62; and the instant that the thread-eyes of the blank are by appropriate means deposited within the socket, as shown in Fig. 78, the clamping carrier die is caused to retreat to its first position of rest, represented in Fig. 18, and the pin block is caused to ascend so as to present the wall $e^2$ between its two levels to the action of said carrier die when the latter, a further feed of the wire having taken place, is caused to take on its initial advance movement, depicted in Figs. 22 and 25, to occasion the clamping of said wire so subsequently fed.

*The rotary carrying mechanism.*—As heretofore explained, the partly completed bent blank shown in Fig. 9, is, by the action of a carrying mechanism which I term the rotary carrier, represented in Figs. 15, 61, 62, and 76, fed or advanced to the devices which swage or flatten its bill before it is bent over, which bend over the bill so swaged and flattened and also bend over the end portion of the blank to form the loop to form the completed hook, and which discharge the completed hook from the machine. The three foregoing instrumentalities, namely: the bill-swaging mechanism, the bill-bending mechanism, and the hook-discharging mechanism, may be located relatively to the formative instrumentalities heretofore described and which perform the earlier operations of bending the blank, in such manner as the constructer may find most convenient, and the partly bent blank may be fed to them in succession by the operation of any carrying mechanism adapted to the purpose. In the interest, however, of compactness and rapidity of operation, I prefer to locate these instrumentalities as they are shown located in the accompanying drawings, and to employ a rotary disk carrier to effect the feeding or advance, which is conveniently of the following construction. N is the rotary carrier, Figs. 15, 61, 62, and 76, a horizontal disk the upper surface of which occupies, in the organization depicted, a plane coincident with the plane occupied by the lower surface of the clamping carrier die. This disk is adapted for intermittent, although constant, rotary movement in the direction of the arrow represented in Fig. 62, by being journaled in any preferred manner with respect to a vertical tubular sleeve $n^x$ suitably housed in the framework of the machine. I find it convenient, as shown in Figs. 61 and 62, to house it by the aid of a circular flange $n^2$ which abuts upon the upper face of the bed plate and is locked by a lock nut $n^3$ threaded upon its lower portion and abutting against the under surface of the bed plate,—and also by the aid of a pair of jam nuts $n^4$ above the carrier. Other forms of axes of support and rotation may, however, be employed in place of the sleeve referred to. The sleeve $n^x$ is tubular to fit it to receive a vertically movable stem which I term a tappet stem $n$, whereof hereinafter. The under surface of the carrier disk is equipped with a fixed circular ratchet $n^5$, Fig. 63, adapted, in order to occasion the predetermined rotary movement of the disk, to be acted upon by a pawl $n^6$ mounted upon the outer extremity of a pawl lever $n^7$ journaled upon the sleeve $n^x$, and pivotally connected at $n'$ at its inner extremity with the inner end of what I term the lever slide $n^8$, which at its outer extremity is provided with a laterally projecting cam roller $n^9$ which is entered within a suitably conformed lateral cam way $n^{10}$ formed in the side face of a cam which I term the ratchet cam $N^x$, mounted upon the fourth shaft $B^4$. The proportions of the ratchet, the timing of the ratchet cam, and the path of its cam-way, are such as to occasion upon every rotation of the cam, such rotary movement of the rotary carrier as will be sufficient to present to a given final advance of the clamping carrier die a given thread-eye socket in the carrier. In other words, the number of teeth in the ratchet corresponding to the number of thread-eye sockets in the carrier, and the pawl acting upon the ratchet teeth one after another, the carrier is caused in making each complete rotation to make as many successive movements of intermittent rotary advance as there are teeth in the ratchet and thread-eye sockets in its own periphery. The carrier disk may be constructed as convenience of manufacture may dictate. I find it convenient to apply its thread eye sockets $n^{11}$, Figs. 37 and 62, by forming them in the edge of small circular socket disks $n^{12}$ which are adapted to be removably applied within countersunk seats $n^{13}$ formed in the upper face of the carrier at regular intervals around its periphery. This, however, is but a workshop expedient, and the sockets may be formed in the substance of the metal of the carrier disk, or otherwise as may be preferred. Assume a given thread-eye socket in the carrier to present in the path of the final advance of the clamping carrier die with a bent blank in its apex-bending recess $d^x$, as shown in Fig. 58, and in such position that, as said carrier die completes its advance, the thread-eyes of the blank present over said socket and slightly above the upper level of the carrier,—the next operation will be to depress the thread-eye-provided extremities of said blank into the socket, so as to effect the engagement, represented in Fig. 78, of the blank by its thread-eyes within the socket to permit, when the carrier die has retreated, of the advance of the blank in the grasp of the socket as the carrier makes its next movement of rotary advance. This action of depression may be accomplished by many contrivances. I find it convenient to resort to a tappet contrivance, invented by John William Granger, and forming the subject matter of his application for patent referred to, shown in Figs. 58, 60, and 62, appropriately made in the following manner. O is the tappet proper, a vertically-moving hammer die of any preferred construction, housed in a boxing $o'$, conveniently supported upon a bracket $o^2$ mounted from the bed plate or other point of fixed support, in such manner as to stand immediately over the position in which the thread-eye sockets successively come to rest, as shown in Figs. 58 and 62. Normally the tappet is maintained in the position represented in said Fig. 58 by the action of a tappet spring $o^3$ extended between a stud $o^4$ projecting from the tappet and a hook $o^5$ connected with the boxing $o'$. In its normal position the striking lower extremity of the tappet comes to rest above a guideway $o^6$, Figs. 58 and 59, likewise invented by the said Granger, conveniently formed by two cheek pieces $o^7$ formed as a part of or fixed to the bottom of the boxing $o'$, and serving to guide the thread eyes of the partly bent blank beneath the tappet and over their socket in the carrier, as will be understood by reference to said figures and to Fig. 78. Obviously, when the thread eyes have been guided into, and have come to rest in, the foregoing position, a depression of the tappet will force them into their socket, the immediately following retreat of the clamping carrier die, heretofore referred to, leaving the blank engaged within the socket. To insure the retention of the blanks within the sockets, I provide an annular guard flange $n^{14}$, Figs. 15, 61, 62, 76, and 77, which is supported in any preferred manner relatively to the top face of the rotary carrier, and which serves to closely cover, so to speak, the thread eye sockets in said carrier. This flange is of course cut away to permit of the descent of the tappet at the point where the latter acts, and also at the points where the bill-bending and discharging mechanisms operate, as hereinafter explained. The operation of the tappet, to occasion the seating of the blank within the thread eye socket is, as shown in Figs. 60, 61, and 62, conveniently accomplished by a tappet hammer $o^8$ affixed to the free extremity of a horizontal hammer arm $o^9$ keyed upon the upper extremity of the tappet stem $n$, which, as explained, passes vertically through the tubular sleeve $n^x$ of the rotary carrier, and to which its lift is imparted by the operation of a stem lever $o^{10}$ fulcrumed at $o^{11}$ below the bed plate, which at its inner end bears beneath the bottom of the stem and at its outer end is pivotally connected at $o^{12}$ with a cam pitman $o^{13}$, which at its upper end is forked to embrace the fourth shaft $B^4$, and which is provided with a cam roller $o^{14}$ adapted to be encountered by a tappet cam $O^x$ on said fourth shaft. A stem spring $o^{15}$ coiled about the tappet stem between the lock nut $n^3$ and a collar $o^{16}$ on said stem below the bed plate, occasions the downward movement of the stem and the consequent trip of the hammer and stroke of the tappet. The timing of the tappet cam is such as to occasion the lift of the stem and tappet hammer as the rotary carrier takes on each of its movements of intermittent advance. In order to insure the accurate presentation of each thread-eye socket in the path of the clamping carrier die for the reception of each succeeding bent blank, I find it advisable to provide a lock for the rotary carrier, which shall for the time being maintain said carrier fixedly at rest and against the possibility of accidental rotary movement. This locking can manifestly be accomplished in many ways. I find it practical and convenient, as shown in Figs. 15, 61, 62, and 76, to provide in the periphery of the carrier disk, preferably in radial alignment below the respective thread-eye sockets, a corresponding series of locking notches $p$, into which is adapted to be successively entered a locking bolt P conveniently mounted upon a bolt slide $p^x$ adapted for transverse reciprocating movement within slide ways $p'$ formed in the bed plate. The advance and retraction of the slide and bolt may easily be effected in different ways. I find it convenient to effect the locking advance by the operation of a flat spring $p^2$ secured at one extremity to a point of fixed attachment, and at its free extremity bearing against the slide; and to effect the retraction by the aid of a cam roller $p^3$, Fig. 61, laterally projecting from the side of the bolt slide and entered within a suitably conformed lateral cam way $p^4$ formed in the bolt cam $P^x$ mounted upon the fourth shaft $B^4$. The timing of the bolt cam is such as to insure the retraction of the bolt an instant in advance of the action of the mechanism for occasioning the rotary advance of the carrier N, while the shoot of the bolt is, as explained, automatically occasioned by the resilience of its spring.

*The bill-swaging mechanism.*—In practice it is of advantage to flatten the bills of garment hooks. It is not, however, of the essence of this invention that the bill of the hook should be flattened,—but, it being of advantage that it should be, I have represented an appropriate swaging or flattening instrumentality to which the rotary carrier advances the blank and to the action of which during one of its dwells it subjects it. This mechanism, shown in Figs. 15, 64, 65, 66, 67, and 76, is conveniently located intermediately between the point at which the carrier receives the partly bent blank, and the point at which is applied the formative mechanism which bends over the bill of said blank and completes the loop of the tongue to form the finished hook. It conveniently consists of a fixed anvil Q, or bed upon which is mounted the under swaging die $q$, and over which plays the upper swaging die $q^x$ to which a movement of vertical reciprocation is imparted. The faces of the respective swaging dies are concave, as shown in Fig. 67, and the dies are matched so that the upper die upon the completion of its stroke incloses the under die and occasions such a bending of both the inner and outer faces of the bill in the region of the apex as is represented in Figs. 10, 12, 13, and 14. The upper die is mounted for movement upon a vertically reciprocating die slide $q'$, housed in a suitable slide bearing $q^2$ conveniently supported upon a standard $q^3$ springing from the bed plate and vertically slotted to receive the free end of a die-operating lever $q^4$ the fulcrum of which is at $q^5$ in said standard and the outer extremity of which is pivotally connected with a cam pitman $q^6$, Fig. 64, from which laterally projects a cam roller $q^7$ entered within a suitably conformed lateral cam way $q^8$ formed in what I term the swaging die cam $Q^x$ upon the third shaft $B^3$, which the lower extremity of said pitman is conveniently bifurcated to straddle. The timing of the swaging die cam is intentionally such as to occasion the descent of the upper swaging die at the instant when, in the rotary advance of the rotary carrier, the bill portion of the partly bent blank is presented and caused to dwell over the face of the lower swaging die, and to occasion the ascent of said die instantly after the completion of the swaging operation and before the further advance of the carrier.

*The bill-bending mechanism.*—After the subjection of the bill to the foregoing operation of swaging, the next operation to be performed upon the bent blank as represented in Fig. 10, is the bending over of the swaged bill into parallelism with the shank, and the completion of the bending of the partly bent-over end portion of the tongue to form the terminal loop of said tongue and complete the hook into its ultimate form, or that represented in Fig. 12, 13, and 14. This bending may be performed by many devices, and it is possible to bend the bill over independently of the bending over of the loop, and either before or after such bending. I prefer, however, to bend both the bill and the loop together, and, for so doing, to resort to essentially the mechanism hereinafter described, which generically considered is of my invention, but which embodies certain specific forms and features of construction and detail hereinafter distinguished, invented by the said Granger, and forming part of the subject matter of his application for patent hereinbefore referred to. In connection with the bill-bending mechanism about to be described, I prefer to employ the guard flange heretofore described for insuring the retention of the swaged and partly-bent blank with respect to the rotary carrier which carries it to the bending mechanism, and a device invented by the said Granger, whereof hereinafter, for preventing the accidental drawing or flattening of the "humped" portion of the tongue. Either or both of these devices, however, may be dispensed with, although it is inadvisable not to employ them. At each predetermined rotary advance of the rotary carrier, one of its thread eye sockets is presented in radial registry with what I term the bill-bending matrix bar R, represented in Figs. 69 to 78 inclusive, and conveniently formed as a vertically reciprocating bar housed in a suitable housing $r$ formed in or applied to the bed plate, and the upper extremity of which is formed with a recess or matrix proper $r^x$, above the floor $r^2$ of which the shank portion of the partly bent and swaged blank of Fig. 10 as advanced by the rotary carrier comes to rest or "dwells." This matrix proper may be formed in any preferred manner. I, however, find it convenient to form it between two walls $r'$, which in effect form a longitudinal slot in the upper end of the matrix bar, and one of which may be dispensed with. The provision of the second wall appertains to Granger's invention and is described and claimed in his application for patent referred to. In its normal position as shown in Fig. 78, the bill-bending matrix bar is sunk to a position in which the upper surfaces or top levels of its walls occupy a plane below the plane of the floor of the thread eye sockets in the rotary carrier, in order that in the rotation of said carrier the radially projecting shank portion of the partly bent blank may be swept over the top of the inner wall and, without interfering with it, come to rest over the matrix proper and between the two walls. Immediately thereafter the matrix bar is caused to rise so as to occupy the position represented in Figs. 69, 70, and 76, in which position the shank portion of the blank rests upon the floor of the matrix proper. Extending longitudinally and centrally of the floor of the matrix proper is a curved crest or rib $r^3$, invented by the said Granger, which I term the "hump"-supporting rib, and which, as shown in Fig. 75, possesses the lateral outline of the "hump" $h$ of the lower "humping" die, and serves to maintain the "humped" portion of the tongue, which in the rise of the matrix bar comes over it, against any possible flattening or drawing out in the subsequent bending over of the end portion of the tongue to form the loop. A lug, stud, pin, or boss of any preferred character, would be an equivalent of the rib represented. When the rotary carrier comes to rest and presents the partly bent blank with respect to the matrix bar, as explained, the said bar is, as stated, caused to rise, and subsequently, after the operation of the other devices which co-operate with it to effect the bending under discussion, is caused to descend to its normal position. This rising and lowering of the matrix bar may be accomplished by many devices. I, however, find it convenient, as shown in Figs. 15, 68, 69, 76, and 77, to effect it by the operation of a matrix-moving slide $r^4$, the same being a longitudinally extending bar of metal housed for reciprocatory movement in a suitable housing $r^5$ formed in or applied to the bed plate. The inner extremity of this slide is provided with an inclined slot $r^6$ within which is entered a slot roller $r^7$ laterally projecting from the basal portion of the matrix bar, and also provided with a lifting incline $r^8$ adapted to bear beneath said roller and the operation of which in the inward movement of the slide is to occasion the lifting of the matrix bar, while the operation of the inclined slot $r^6$ in the outward movement of the slide is to occasion the depression of said matrix. The appropriate longitudinal movements may be imparted to the matrix moving slide $r^4$ in many ways. I find it convenient to equip the outer extremity of the slide with a laterally projecting cam roller $r^9$, which is entered within a suitably conformed lateral cam way $r^{10}$ formed in an appropriately-timed cam which I term the matrix cam $R^x$, mounted on the third shaft $B^3$. When the rotary carrier has come to its "dwell," and has presented the partly-bent blank with respect to the matrix as explained, I insure the temporary retention of the blank within the thread eye socket and relatively to the floor of the matrix by the employment, as shown in Figs. 15, 68, 69, 76, and 77, of a vertically moving blank-retaining device, or blank gripper S, as I may call it, which is disposed so as to overhang the thread eye sockets as they successively present to the matrix, and which descends upon the thread eyes of the particular blank within the socket for the time presenting, and remains in tread thereon until the completion of the performance of the bill-bending action under discussion. This gripper is conveniently composed of a vertical slide, Figs. 68, 69, 76, and 77, to which the letter S is applied, which is housed in a gripper bearing $s$ supported upon a suitable standard $s^x$ springing from the housing $r^5$ or other point of fixed support, and which is disposed to engage the blank by the operation of a gripper lever $s'$ the inner extremity of which bears upon the head of the gripper, which is fulcrumed at $s^2$ upon a suitable fulcrum standard $s^3$, and the outer extremity of which is provided with a laterally extending friction roll $s^4$ which treads upon the upper surface of the bill pin slide $U^x$ hereinafter referred to, and which surface is possessed of two levels connected by a lever-tilting incline $s^5$ which in the advance of the slide occasions the elevation of the outer end of the gripper lever and the consequent depression of the gripper. The elevation of the gripper S may be conveniently effected by a gripper spring $s^6$ hung between a fixed pin $s^7$ upon the gripper bearing or housing $s$, and a gripper spring pin $s^8$, on the gripper itself, as shown in Figs. 68, 69, and 77. The actuating mechanism of the bill-bending slide hereinafter described, is timed to occasion the appropriate advance and retreat of said slide, and the consequent appropriately timed descent of the gripper. Bearing in mind that the rise of the matrix bar in the timing of the parts in the organization represented in the drawings, takes place after the descent of the blank gripper,— the next device called into play is one for depressing the bill in the region of its apex to insure the maintenance of the shank and spring tongue portions of the blank upon the floor of the elevated matrix, in order that the bill pin U hereinafter described may unfailingly pass over said shank and tongue. The depressing device referred to is the invention of the said Granger, and described and claimed in his application for patent referred to, and is what may be termed a bill-depressing pin T, Figs. 15, 68, 69, 71, 72, 76, and 77. This pin is conveniently constituted by a vertical stud downwardly projecting from the inner end of a longitudinally extending pin lever $t$, fulcrumed at $t^x$ to a standard or other fixed support, and at its outer extremity equipped with a cam roller $t'$ which treads upon the periphery of the matrix cam $R^x$ heretofore described, and which cam as to its said periphery is provided with a cam crest $r^{11}$ so formed as to impart to the lever such appropriate deflection as will occasion the downward movement of the depressing pin to engagement upon the bill in the manner represented in Figs. 71 and 72. The elevation of the lever and pin is conveniently secured by an elevating spring $t^2$, Figs. 15, 76 and 77, connected at its lower extremity with the inner end of the lever and at its upper extremity with a retaining stud $t^3$ upon the slide bearing $q^2$, or other point of fixed attachment. The timing of the matrix cam is such as to insure the holding down of the bill of the blank by the depressing pin during the period of the insertion of what I term the bill-bending pin, or the pin around which as a former the bill proper and the loop are finally bent. The bill-bending pin is designated by the letter U, and may be of any preferred character and actuated by any preferred device. I have formed and operated it as a curved bar, but it preferably consists of a straight cylindric rod of diameter equal to the internal diameter of the eye-engaging bends of the completed hook, of a character devised by the said Granger, and which is disposed transversely of the machine and horizontally and is adapted to be alternately entered through and withdrawn from a pair of aligned pin throats $u$ formed transversely through the walls $r'$ of the bill-bending matrix bar. The rectilinear thrust and retraction of this pin can be occasioned by any preferred device, but are, as shown in Figs. 68 and 77, conveniently brought about by mounting the pin upon the inner end of a horizontally traveling bill pin slide $u^x$, mounted in the transverse ways $u'$ in the framework, and at its outer extremity linked by a link $u^2$ to the upper extremity of a vertical slide rocker $u^3$ fulcrumed at its lower extremity at $u^4$ to the framework, and intermediately of its length provided with a laterally projecting cam roller $u^5$ entered within a suitably conformed lateral cam way $u^6$ formed in a cam which I term the bill-bending cam pin $U^x$, mounted upon the fourth shaft $B^4$ and timed to occasion the advance of the bill pin slide and pin, for the thrust of the latter through the pin throats, immediately after the action of the bill-depressing pin described. Assuming the bill-bending pin to have been thrust through the pin throats and over the blank as represented in Fig. 72,—the next action in point of time is the rise of the bill-depressing pin to set free the bill to permit of its being bent up in the manner depicted in Fig. 73 into the position which it is represented as occupying in Fig. 11. This action is conveniently accomplished by the operation of what I term the bill-upturning former V, Figs. 69, 73, and 76,—the same being a vertically disposed bar of metal, conveniently housed for vertical reciprocation in the housing $r$ of the bill-bending matrix bar, against the outer side face of which it bears and travels. The sole function of this former being to strike the bill portion of the partly bent blank to a right angle with respect to the shank portion, and at the same time to complete a half bend in the end portion of the tongue,—its sole movement is an up and down movement, timed to occur at the proper interval between the movement of the other elements of the bending mechanism generically considered of which it is an element. This up and down movement may obviously be accomplished by many means. I find it convenient to effect it by the aid of a lifting rocker arm $v$, Figs. 68 and 69, the inner extremity of which is adapted to a notch $v^x$ in the former, and the outer extremity of which is keyed upon a rock shaft $v'$ conveniently housed for oscillatory movement transversely in the housing $r^5$ or other fixture of the framework, and to which is also affixed an oppositely projecting cam rocker arm $v^2$, the outer extremity of which is provided with a lateral cam roller $v^3$ entered within a suitably conformed lateral cam way in a cam which I term the bill-completing cam $V^x$, mounted upon the third shaft $B^3$, and timed to occasion the appropriate oscillation of the rock shaft and consequent elevation and depression of the bill-upturning former. Assuming the bill to have been bent to the form represented in Figs. 11 and 73, and the bill-upturning former to have sunk to its normal position as shown in Fig. 76, the final operation upon the blank is the overturning, or closing as I prefer to express it, of the upturned bill into parallelism with the shank portion of the hook, and the completion of the formation of the full bend or loop in the end portion of the tongue. These operations, which, as explained, I prefer to perform simultaneously, are readily and conveniently performed by the operation of a longitudinally reciprocating former which I term the bill-closing former W, Figs. 15, 68, 69, 74, 76, and 77,—the same being a bar of metal applied to the inner extremity of the bill-closing former slide $w$, adapted for longitudinal reciprocation in ways $w^x$ springing from the bed plate, and conveniently formed in the casting which embodies the housing $r$ of the bill-bending matrix bar and the housing $r^5$ of the matrix moving slide, and the outer extremity of which slide is provided with a lateral cam roller $w'$ entered within a suitable conformed lateral cam way $w^2$, formed in the bill-completing cam $V^x$ heretofore referred to upon the opposite face of said cam from that in which is formed the cam way $V^4$ into which is entered the roller $v^3$ of the cam rocker arm $v^2$. The path of the cam way $w^2$ is calculated to occasion the appropriate advance and retreat of the bill-closing former. Simultaneously with the retreat of the bill-closing former upon the completion of the formation of the hook, the bill-bending pin is retracted, the bill-bending matrix bar caused to descend to its lowest position, and the rotary carrier caused to advance to carry away from the bill-bending mechanism as an entirety the hook just completed and feed to it succeeding partly bent and swaged blank for completion into a completed hook.

*The hook-discharging mechanism.*—The continued rotary advance of the rotary carrier occasions the presentation of each completed hook *seriatim* to a device which I find it convenient to employ for the automatic discharge of the completed hook from said carrier, and which I term the knock-off. This knock-off, represented in Figs. 15, 60, and 62, is conveniently formed as a tappet or foot, and it is set to encounter the bent bill of the completed hook, and by descending impart to the hook a tilt which unseats its thread-eyes from their socket in the carrier. It is conveniently mounted in a radial supporting arm $x^2$ springing from the tappet stem $n$, which, as explained, carries the tappet which deposits the partly bent blank into its socket in the carrier. Obviously, this device may be dispensed with and the hooks be manually removed from the carrier, or, if desired, unseated therefrom by the operation of any device which would be the equivalent of the knock-off, and which, for instance, may act from below as well as from above. As already explained, the action of the knock-off represented and described is made possible by forming a notch in the guard flange $n^2$ of the carrier.

Having thus described my invention, I claim:

1. In the formation from a wire blank of appropriate length of a garment hook embodying between its lateral members a spring tongue formed with a "hump,"—the method herein described, which consists in curving or bending to the form of a "hump" that portion of the blank which in the ultimate structure constitutes the spring tongue, before said portion is bent into its ultimate position intermediate of said lateral members, substantially as set forth.

2. In the formation from a wire blank of appropriate length of a garment hook embodying between its lateral members a spring tongue formed with a "hump,"—the method herein described, which consists, first, in curving or bending to the form of a "hump" that portion of the blank which in the ultimate structure constitutes the spring tongue, before said portion is bent into its ultimate position intermediate of said lateral members, and in then bending said spring tongue portion to form a loop after said portion has been brought into its aforesaid ultimate position, substantially as set forth.

3. The method herein described of making from a single piece of wire a garment hook embodying between its lateral members a loop-provided "humped" spring tongue, which consists in the performance in due order of the following steps, namely:—feeding a wire;—forming a length of the wire so fed into a "humped" spring tongue having a prolonged end portion;—forming thread eyes upon the wire so conformed;—bending the spring tongue portion of the wire into parallelism with its body portion between the thread eyes;—bending said body midway of the thread eyes to form the apex of the bill;—bending over into its ultimate position the bill portion of the bent blank so formed;—and bending over the prolonged end portion of the spring tongue to form a loop;—substantially as and for the purposes set forth.

4. The method herein described of making from a single piece of wire a garment hook embodying between its lateral members a loop-provided "humped" spring tongue, which consists in the performance in due order of the following steps, namely:—feeding a wire;—clamping the wire so fed and cutting it off to a blank of appropriate length;—forming the blank with a "humped" spring tongue having a prolonged end portion;—forming the blank with thread eyes;—bending the spring tongue portion of the blank into parallelism with its body portion;—bending the body portion of said blank midway of the thread eyes;—bending over into its ultimate position the bill portion of the bent blank so formed;—and bending over the end portion of the tongue to form a loop;—substantially as set forth.

5. The method herein described of making from a single piece of wire a garment hook embodying between its lateral members a loop-provided "humped" spring tongue;—which consists in the performance in due order of the following steps, namely:—feeding a wire;—forming a length of the wire so fed into a "humped" spring tongue having a prolonged end portion;—imparting to said end portion an initial loop-like bend;—forming thread eyes upon the wire so conformed;—bending the spring tongue portion of the blank into parallelism with its body portion;—bending said body midway of the thread eyes to form the apex of the bill;—bending over into its ultimate position the bill portion of the bent blank so formed;—and imparting a final bend to the end portion of the tongue to form the completed loop;—substantially as set forth.

6. The method herein described of making from a single piece of wire a garment hook embodying between its lateral members a loop-provided "humped" spring tongue, which consists in the performance in due order of the following steps, namely:—feeding a wire;—forming a portion of said wire into a "humped" spring tongue having a prolonged end portion;—forming thread eyes upon the wire so formed with a tongue;—bending said tongue into parallelism with the body portion of the wire between the thread eyes;—bending said body portion midway of the thread eyes;—and, contemporaneously bending, by a single operation and by a common instrumentality, both the bill into its ultimate position and the end portion of the tongue into its looped form;—substantially as set forth.

7. The method herein described of making from a single piece of wire a garment hook embodying between its lateral members a loop-provided "humped" spring tongue, which consists in the performance in due order of the following steps, namely:—feeding a wire;—clamping the wire so fed and cutting it off to a blank of appropriate length;—forming the blank with a "humped" spring tongue having a prolonged end portion;—forming the blank with thread eyes;—bending the spring tongue portion of the blank into parallelism with its body portion;—bending the body portion of said blank midway of the thread eyes;—and, contemporaneously bending, by a single operation and by a common instrumentality, both the bill into its ultimate position and the end portion of the tongue into its looped form;—substantially as set forth.

8. In a machine for making a garment hook from a single piece of wire, the following instrumentalities in combination, namely:— mechanism for bending the wire to form the bill, the shank, the thread eyes, and the "humped" spring tongue of a garment hook of the character described,—and mechanism for forming a loop upon the "humped" spring tongue,—substantially as set forth.

9. In a machine for making garment hooks, the following instrumentalities in combination, namely:—first, a wire-bending mechanism which forms the left thread eye; second, a wire-bending mechanism which forms the right thread eye; third, mechanism for forming a spring tongue with a "hump" in it; fourth, mechanism for forming a loop upon said spring tongue; fifth, mechanism for bending the blank midway of the thread eyes to form the apex of the bill; and, sixth, mechanism for bending over the bill;—substantially as set forth.

10. In a machine for making garment hooks, the following instrumentalities in combination, namely:—first, a wire-bending mechanism which forms the left thread eye; second, a wire-bending mechanism which forms the right thread eye; third, mechanism for forming a spring tongue with a "hump" in it; fourth, mechanism for forming a loop upon said spring tongue; fifth, mechanism for bending the blank mid-way of the thread eyes to form the apex of the bill; sixth, mechanism for flattening the bill; and, seventh, mechanism for bending over the bill;—substantially as set forth.

11. In a machine for making garment hooks, the following instrumentalities in combination, namely:—first, wire-bending mechanism which forms the left thread eye;—second, wire-bending mechanism which forms the right thread eye;—third, mechanism which forms a spring tongue with a "hump" in it and which imparts an initial bend to a loop to be formed on said tongue;—fourth, mechanism for bending the wire mid-way of the thread eyes to form the apex of the bill;—and, fifth, mechanism for bending over the bill and completing the formation of the loop on the tongue;—substantially as set forth.

12. In a machine for making garment hooks, the following instrumentalities in combination, namely:—first, wire-bending mechanism which forms the left thread eye;—second, wire-bending mechanism which forms the right thread eye;—third, mechanism which forms a spring tongue with a "hump" in it and which imparts an initial bend to a loop to be formed on said tongue;—fourth, mechanism for bending the wire midway of the thread eyes to form the apex of the bill;—fifth, bill-flattening mechanism;—and, sixth, mechanism for bending over the bill and completing the formation of the loop on the tongue;—substantially as set forth.

13. In a machine for making a garment hook, in combination with a group of associated and co-operating instrumetalities consisting of a wire-feeding mechanism, a wire-clamping mechanism, a wire-shearing or dividing mechanism, a wire-bending mechanism which forms the left thread eye, a wire-bending mechanism which forms the right thread eye, tongue-conforming mechanism which forms a "humped" spring tongue, tongue-paralleling mechanism, and bill-forming mechanism;—and in combination also with bill-bending mechanism;—blank-advancing mechanism which automatically advances the blank formed by the action of the foregoing group of instrumentalities to a carrying-off mechanism;—and a carrying-off mechanism intermediate the blank advancing mechanism and the bill-bending mechanism and which automatically delivers the advanced blank to the bill-bending mechanism;—substantially as set forth.

14. In a machine for making a garment hook, the following instrumentalities in combination, namely:—first, a wire-bending mechanism;—second, a wire-clamping mechanism;—third, a wire-shearing or dividing mechanism;—fourth, a wire-bending mechanism which forms the left thread eye;—fifth, a wire-bending mechanism which forms the right thread eye;—sixth, mechanism which forms a "humped" spring tongue and imparts an initial bend to a loop to be formed on said tongue;—seventh, mechanism which parallels the tongue with the clamped body of the blank;—eighth, bill-forming mechanism;—ninth, bill-advancing mechanism;—tenth, carrying-off mechanism;—and, eleventh, mechanism which bends over the bill and completes the formation of the loop upon the tongue;—substantially as set forth.

15. In a machine for making a garment hook, the following elements in combination, namely:—the clamping carrier die D,—the pin block E,—the right-angling former G,—and means for operating said several elements in due order,—substantially as and for the purposes set forth.

16. In a machine for making a garment hook, a wire shearing or dividing mechanism which cuts off a length or blank of wire sufficient to form one hook, and which is composed of the following elements in combination, namely:—the shears carrier F, provided with a guide throat $f$,—the pivoted shears $f^9$ mounted upon said shears carrier,—mechanism essentially such as set forth for occasioning the predetermined lift and drop of said shears carrier,—and mechanism essentially such as set forth for occasioning the oscillation of said shears relatively to said guide throat,—substantially as and for the purposes set forth.

17. In a machine for making a garment hook, a wire-bending mechanism which forms the left thread eye of the hook, and which is composed of the following elements in combination, namely :—the clamping carrier die D, provided with the eye-bending notch $d'$,—the pin block E, provided with the thread eye pin $e^4$,—the right angling former G,—the tongue-paralleling former M,—and means for operating said several elements in due order,—substantially as and for the purposes set forth.

18. In a machine for making a garment hook, a wire-bending mechanism which forms the right thread eye of the hook, and which is composed of the following elements in combination, namely:—the clamping carrier die D,—the pin block E,—the rear former J,—the front former K, provided with the shoulder $k$,—the eye-closing former L, provided with the eye-bending recess $l$,—and means for operating said several elements in due order,—substantially as and for the purposes set forth.

19. In a machine for making a garment hook, a wire-bending mechanism which forms a "hump" in the spring tongue and imparts an initial bend to the end portion of said tongue, and which is composed of the following elements in combination, namely:—the clamping carrier die D,—the pin block E, provided with the thread eye pin $e^4$,—the lower "humping" die H, provided with the "hump" $h$ and with the incline $h^\times$,—the upper "humping" die I,—and means for operating said several elements in due order,—substantially as and for the purposes set forth.

20. In a machine for making a garment hook, the following elements in combination, namely:—the clamping carrier die D,—the pin block E, provided with the thread eye pin $e^4$,—the right-angling former G,—the tongue-paralleling former M,—and means for operating said several elemens in due order,—substantially as and for the purposes set forth.

21. In a machine for making a garment hook, a wire-bending mechanism which bends the wire blank midway of the thread eyes to form the apex or point of the bill, and which is composed of the following elements in combination, namely;—the clamping carrier die D, provided with the apex-bending recess $d^\times$,—the pin block E, provided with the apex pin $e^3$,—mechanism for occasioning the predetermined elevation and depression of the pin block,—and mechanism for occasioning the predetermined advance and retreat of the clamping carrier die,—substantially as and for the purposes set forth.

22. In a machine for making a garment hook, in combination with the clamping carrier die D, provided with the apex-bending recess $d^\times$, and with mechanism for occasioning the predetermined advance and retreat of said clamping carrier die,—the rotary carrier N, provided with the peripheral thread eye sockets $n^{11}$,—and mechanism for occasioning the intermittent rotation of said rotary carrier,—substantially as and for the purposes set forth.

23. In a machine for making a garment hook, in combination:—a rotary carrier provided with peripherally disposed thread eye sockets,—mechanism for occasioning the intermittent rotation of said carrier,—mechanism for supplying a partly-bent blank in turn to each socket of said carrier,—bill-bending mechanism which bends over the bill to form the ultimate hook,—and means for operating said several mechanisms in due order,—substantially as and for the purposes set forth.

24. In a machine for making a garment hook, in combination:—a rotary carrier provided with peripherally disposed thread eye sockets,—mechanism for occasioning the intermittent rotation of said carrier,—mechanism for supplying a partly-bent blank in turn to each socket of said carrier,—bill-swaging mechanism for swaging the bill of each partly-bent blank,—bill-bending mechanism for bending over the bill to form the ultimate hook,—and means for operating said several mechanisms in due order,—substantially as and for the purposes set forth.

25. In a machine for making a garment hook, in combination:—a rotary carrier provided with peripherally disposed thread eye sockets,—mechanism for occasioning the intermittent rotation of said carrier,—mechanism for supplying a partly-bent blank in turn to each socket of said carrier,—bill-swaging mechanism for swaging the bill of each partly-bent blank,—bill-bending mechanism for bending over the bill to form the ultimate hook,—hook-discharging mechanism,—and means for operating said several mechanisms in due order,—substantially as and for the purposes set forth.

26. In a machine for making a garment hook:—a carrying-off mechanism consisting of the rotary carrier N, provided with peripherally-disposed thread eye sockets,—a fixed guard flange for said sockets,—and mechanism for occasioning the predetermined intermittent rotation of said carrier,—substantially as and for the purposes set forth.

27. In a machine for making a garment hook:—a carrying-off mechanism consisting of the rotary carrier N provided with peripherally-disposed thread eye sockets,—a fixed guard flange for said sockets,—mechanism for occasioning the predetermined intermittent rotation of said carrier,—and mechanism for locking said carrier during the period of each of its dwells,—substantially as and for the purposes set forth.

28. In a machine for making a garment hook, a bill-swaging mechanism which flattens the bill of the partly-bent blank, and which is composed of the following elements in combination, namely:—the anvil Q,—the under swaging die $q$,—the upper swaging die $q^x$,—means for occasioning the predetermined stroke of said upper swaging die,—and the rotary carrier die N which presents the blank to the lower swaging die,—substantially as and for the purposes set forth.

29. In a machine for making a garment hook, a bill-bending mechanism which bends over the bill to form the completed hook, and which is composed of the following elements in combination, namely:—the bill-bending matrix bar R, provided with the matrix proper $r^x$,—the bill bending pin U,—the bill-upturning former V,—the bill-closing former W,—and means for operating said several elements in due order,—substantially as and for the purposes set forth.

30. In a machine for making a garment hook, a bill-bending mechanism which bends over the bill to form the ultimate hook, and which is composed of the following elements in combination, namely:—the bill-bending matrix bar R, provided with the matrix proper $r^x$,—the blank gripper S,—the rotary carrier N,—the bill-depressing pin T,—the bill-bending pin U,—the bill-upturning former V,—the bill-closing former W,—and means for operating said several elements in due order,—substantially as and for the purposes set forth.

In testimony that I claim the foregoing as my invention I have hereunto signed my name this 8th day of July, 1892.

ROBERT C. MANVILLE.

In presence of—
J. BONSALL TAYLOR,
M. H. BRENNAN.

Corrections in Letters Patent No. 491,289.

It is hereby certified that in Letters Patent No. 491,289, granted, February 7, 1893, upon the application of Robert C. Manville, of Waterbury, Connecticut, for an improvement in "Methods of and Machines for Making Garment Hooks," errors appear in the printed specification requiring correction as follows: In line 69, page 1, the comma after the word "are" should be stricken out and in lines 69-70, the clause "for the purposes of this description," should be stricken out and the same inserted after line 71, same page and that the said Letters Patent should be read with these corrections therein that the same may conform to the record of the case in the Patent Office.

Signed, countersigned, and sealed this 21st day of February, A. D. 1893.

[SEAL.]
CYRUS BUSSEY,
*Assistant Secretary of the Interior.*

Countersigned:
W. E. SIMONDS,
*Commissioner of Patents.*